US011954867B2

(12) United States Patent
Fukiage et al.

(10) Patent No.: US 11,954,867 B2
(45) Date of Patent: Apr. 9, 2024

(54) MOTION VECTOR GENERATION APPARATUS, PROJECTION IMAGE GENERATION APPARATUS, MOTION VECTOR GENERATION METHOD, AND PROGRAM

(71) Applicant: NIPPON TELEGRAPH AND TELEPHONE CORPORATION, Tokyo (JP)

(72) Inventors: Taiki Fukiage, Tokyo (JP); Shinya Nishida, Tokyo (JP); Takahiro Kawabe, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 324 days.

(21) Appl. No.: 17/296,464

(22) PCT Filed: Nov. 14, 2019

(86) PCT No.: PCT/JP2019/044619
§ 371 (c)(1),
(2) Date: May 24, 2021

(87) PCT Pub. No.: WO2020/110738
PCT Pub. Date: Jun. 4, 2020

(65) Prior Publication Data
US 2021/0398293 A1 Dec. 23, 2021

(30) Foreign Application Priority Data

Nov. 28, 2018 (JP) ................................ 2018-221942

(51) Int. Cl.
*H04N 9/31* (2006.01)
*G06T 3/00* (2006.01)
(Continued)

(52) U.S. Cl.
CPC ............... *G06T 7/215* (2017.01); *G06T 3/08* (2024.01); *G06T 3/18* (2024.01); *G06T 5/50* (2013.01);
(Continued)

(58) Field of Classification Search
CPC .... H04N 19/527; H04N 19/51; H04N 19/521; H04N 19/513; H04N 19/139;
(Continued)

(56) References Cited

U.S. PATENT DOCUMENTS 10,571,794 B2     2/2020  Kawabe et al.
2004/0252230 A1 * 12/2004  Winder ................... G06T 5/002
                                                348/E7.071
(Continued)

FOREIGN PATENT DOCUMENTS

JP          2557466 B2  * 11/1996
NO       2015/163317 A1   10/2015
WO    WO-2020077198 A1  *  4/2020

OTHER PUBLICATIONS

Search machine translation: Low-frequency Replacement Circuit For MUSE Decoder of JP 2557466 B2 to Ryuichi, retrieved May 10, 2023, 7 pages. (Year: 2023).*

(Continued)

*Primary Examiner* — Matthew C Bella
*Assistant Examiner* — Dennis Rosario

(57) ABSTRACT

A technique that automatically adjusts a motion given to a projection target using a perceptual model is provided. A motion vector generation apparatus includes a first parameter generation unit that generates a first parameter that is a parameter for scaling a motion vector based on a perceptual difference between a projection result reproduction image which is an image that is obtained when a projection target onto which a projection image obtained based on the motion (Continued)

vector has been projected is photographed and a warped image which is an image generated by distorting an image obtained when the projection target is photographed by a perceptual amount of motion perceived when the projection result reproduction image is viewed, and a motion vector reduction unit that scales the motion vector using the first parameter.

10 Claims, 17 Drawing Sheets

(51) Int. Cl.
| | | |
|---|---|---|
| *G06T 3/08* | (2024.01) | |
| *G06T 3/18* | (2024.01) | |
| *G06T 5/00* | (2006.01) | |
| *G06T 5/50* | (2006.01) | |
| *G06T 5/80* | (2024.01) | |
| *G06T 7/207* | (2017.01) | |
| *G06T 7/215* | (2017.01) | |
| *G06T 7/254* | (2017.01) | |

(52) U.S. Cl.
CPC ................ *G06T 5/80* (2024.01); *G06T 7/207* (2017.01); *G06T 7/254* (2017.01); *H04N 9/3179* (2013.01); *H04N 9/3185* (2013.01); *H04N 9/3188* (2013.01)

(58) Field of Classification Search
CPC ........ H04N 19/36; H04N 19/30; H04N 19/31; H04N 19/33; H04N 19/34; H04N 7/014; H04N 19/573; H04N 19/577; H04N 19/58; H04N 19/583; H04N 23/632; H04N 19/56; H04N 9/3185; H04N 9/3188; H04N 19/154; H04N 13/363; H04N 9/31; G06T 7/20; G06T 3/0093; G06T 5/50; G06T 5/006; G06T 2210/44; G06T 3/40; G06T 3/005; G06V 40/20
See application file for complete search history.

(56) References Cited

U.S. PATENT DOCUMENTS

| | | | |
|---|---|---|---|
| 2006/0257048 A1* | 11/2006 | Lin | G06V 20/40 |
| | | | 382/276 |
| 2014/0218569 A1* | 8/2014 | Tsubaki | H04N 23/6842 |
| | | | 348/241 |
| 2014/0292817 A1* | 10/2014 | Iversen | H04N 9/317 |
| | | | 345/672 |
| 2017/0006284 A1* | 1/2017 | Gokhale | H04N 19/573 |
| 2019/0124332 A1* | 4/2019 | Lim | H04N 19/137 |
| 2020/0150521 A1 | 5/2020 | Kawabe et al. | |

OTHER PUBLICATIONS

Taiki Fukiage et al., "A model of V1 metamer can explain perceived deformation of a static object induced by light projection", Vision Sciences Society, Florida, U. S. A., May 2016.

* cited by examiner

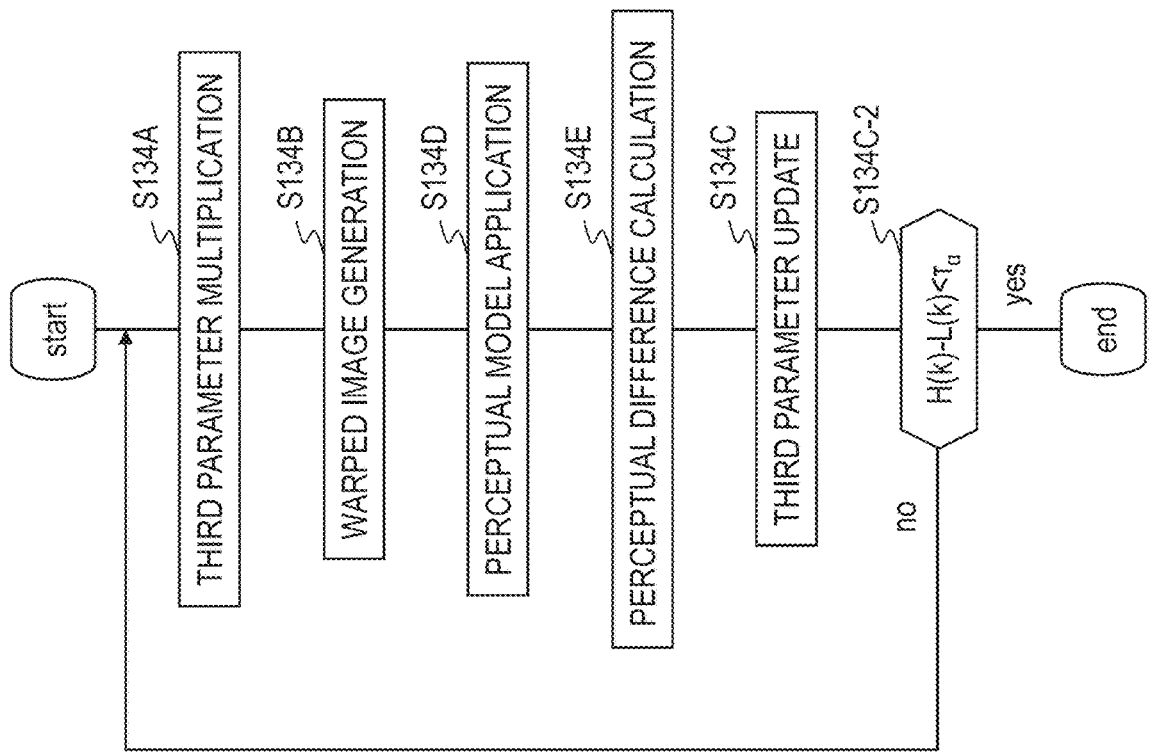

ALGORITHM 1: Smoothing algorithm $\forall m, n, t \quad \lambda'(m,n,t) \Leftarrow \lambda(m,n,t)$
for $t = 0$ to $N_t - 1$ do
  for $m = 0$ to $N_m - 1$ do
    for $n = 0$ to $N_n - 1$ do
      $\lambda'(m,n,t) \Leftarrow GetMinimum(\lambda', m, n, t, -1, -1, -1)$
for $t = N_t - 1$ to $0$ do
  for $m = 0$ to $N_m - 1$ do
    for $n = 0$ to $N_n - 1$ do
      $\lambda'(m,n,t) \Leftarrow GetMinimum(\lambda', m, n, t, -1, -1, 1)$
for $t = 0$ to $N_t - 1$ do
  for $m = N_m - 1$ to $0$ do
    for $n = 0$ to $N_n - 1$ do
      $\lambda'(m,n,t) \Leftarrow GetMinimum(\lambda', m, n, t, 1, -1, -1)$
for $t = N_t - 1$ to $0$ do
  for $m = N_m - 1$ to $0$ do
    for $n = 0$ to $N_n - 1$ do
      $\lambda'(m,n,t) \Leftarrow GetMinimum(\lambda', m, n, t, 1, -1, 1)$
for $t = 0$ to $N_t - 1$ do
  for $m = 0$ to $N_m - 1$ do
    for $n = N_n - 1$ to $0$ do
      $\lambda'(m,n,t) \Leftarrow GetMinimum(\lambda', m, n, t, -1, 1, -1)$
for $t = N_t - 1$ to $0$ do
  for $m = 0$ to $N_m - 1$ do
    for $n = N_n - 1$ to $0$ do
      $\lambda'(m,n,t) \Leftarrow GetMinimum(\lambda', m, n, t, -1, 1, 1)$
for $t = 0$ to $N_t - 1$ do
  for $m = N_m - 1$ to $0$ do
    for $n = N_n - 1$ to $0$ do
      $\lambda'(m,n,t) \Leftarrow GetMinimum(\lambda', m, n, t, 1, 1, -1)$
for $t = N_t - 1$ to $0$ do
  for $m = N_m - 1$ to $0$ do
    for $n = N_n - 1$ to $0$ do
      $\lambda'(m,n,t) \Leftarrow GetMinimum(\lambda', m, n, t, 1, 1, 1)$

Function $GetMinimum(\lambda', m, n, t, d_m, d_n, d_t)$
    return $\min(\lambda'(m,n,t),$
              $\lambda'(m+d_m, n, t) + s_s,$
              $\lambda'(m, n+d_n, t) + s_s,$
              $\lambda'(m+d_m, n+d_n, t) + \sqrt{2}s_s,$
              $\lambda'(m, n, t+d_t) + s_t,$
              $\lambda'(m+d_m, n, t+d_t) + \sqrt{s_s^2 + s_t^2},$
                $\lambda'(m, n+d_n, t+d_t) + \sqrt{s_s^2 + s_t^2},$
              $\lambda'(m+d_m, n+d_n, t+d_t) + \sqrt{2s_s^2 + s_t^2})$

Fig. 7

ALGORITHM 1: Smoothing algorithm $\forall m, n \quad \lambda'(m,n) \Leftarrow \lambda(m,n)$
for $m = 0$ to $N_m - 1$ do
  for $n = 0$ to $N_n - 1$ do
    $\lambda'(m,n) \Leftarrow GetMinimum(\lambda', m, n, -1, -1)$
for $m = N_m - 1$ to $0$ do
  for $n = 0$ to $N_n - 1$ do
    $\lambda'(m,n) \Leftarrow GetMinimum(\lambda', m, n, 1, -1)$
for $m = 0$ to $N_m - 1$ do
  for $n = N_n - 1$ to $0$ do
    $\lambda'(m,n) \Leftarrow GetMinimum(\lambda', m, n, -1, 1)$
for $m = N_m - 1$ to $0$ do
  for $n = N_n - 1$ to $0$ do
    $\lambda'(m,n) \Leftarrow GetMinimum(\lambda', m, n, 1, 1)$ Function $GetMinimum(\lambda', m, n, d_m, d_n)$
  return $\min(\lambda'(m,n),$
  $\lambda'(m + d_m, n) + s_s,$
  $\lambda'(m, n + d_n) + s_s,$
  $\lambda'(m + d_m, n + d_n) + \sqrt{2}s_s,$

Fig. 11

MOTION VECTOR GENERATION APPARATUS, PROJECTION IMAGE GENERATION APPARATUS, MOTION VECTOR GENERATION METHOD, AND PROGRAM

CROSS-REFERENCE TO RELATED APPLICATIONS

This application is a U.S. 371 Application of International Patent Application No. PCT/JP2019/044619, filed on 14 Nov. 2019, which application claims priority to and the benefit of JP Application No. 2018-221942, filed on 28 Nov. 2018, the disclosures of which are hereby incorporated herein by reference in their entireties.

TECHNICAL FIELD

The present invention relates to a technique for making a target that is not actually moving feel as if it is moving.

BACKGROUND ART

Projection mapping has begin to be widely used as a technique for changing the appearance of a target which is a real object. In projection mapping, the appearance of an object (a projection target) is manipulated by projecting an image (or picture) on the surface of the object using a projector. Patent Literature 1 proposes a method of giving an impression of motion to a stationary projection target by applying this technique. In Patent Literature 1, a picture is generated by adding a motion to a grayscale image of a projection target on a computer, and a picture corresponding to the difference between each frame of the generated picture and the original grayscale image is obtained as a projection image. By setting the projection image in grayscale, it is possible to selectively stimulate a notion information detection mechanism of the human visual system because the human visual system perceives motion information mainly based on luminance information. On the other hand, it is possible to give only an impression of motion to the projection target while maintaining the natural appearance of the projection target because it maintains the shape, texture, and color information of the original appearance. Thus, it is possible to make the viewer feel as if the projection target that is not actually moving is moving.

However, there is actually some discrepancy between the projection image containing motion information and the original shape, texture, and color information (the projection target that is not actually moving). If the discrepancy is not so large, it is acceptable to the human visual system and causes no problem in appearance. However, if the discrepancy is large, the projection image does not look fit for the projection target that is not actually moving, giving an unnatural impression. In general, it is known that the degree of discrepancy between the projection image and the projection target tends to increase as the magnitude of the motion given increases. However, it is difficult to predict how large a magnitude of the motion will give an unnatural impression because this depends on conditions such as the pattern of the projection target, the dynamic range of the projector, the resolution of the projector, the intensity of ambient light, and the sensitivity of the human visual system.

CITATION LIST

Patent Literature

Patent Literature 1: WO 2015/163317

Non Patent Literature

Non Patent Literature 1: Taiki Fukiage, Takahiro Kawabe, Shin'ya Nishida, "A model of V1 metamer can explain perceived deformation of a static object induced by light projection", Vision Sciences Society, Florida, U.S.A., May 2016

SUMMARY OF THE INVENTION

Technical Problem

In Patent Literature 1 regarding the projection mapping technique that gives an impression of motion to areal object, the magnitude of motion is manually adjusted to eliminate the sense of discrepancy (the unnaturalness of the projection result) between the projection image and the projection target. However, it takes time to manually adjust the magnitude of motion. Further, because the magnitudes of motion optimal for regions and frames of given nodal information are generally different, it is a very difficult task to manually optimize all of them.

On the other hand, Non Patent Literature 1 proposes a perceptual model that estimates the unnaturalness of a projection result of a projection target when three elements, motion information given to the projection target, an image of the projection target before projection, and an image obtained by photographing the projection result, are given. However, how to optimize the motion information based on such results has not been proposed so far.

It is an object of the present invention to provide a technique for automatically adjusting a motion given to a projection target using a perceptual model.

Means for Solving the Problem

To solve the above problems, a motion vector generation apparatus according to an aspect of the present invention includes a first parameter generation unit configured to generate a first parameter that is a parameter for scaling a motion vector based on a perceptual difference between a projection result reproduction image which is an image that is obtained when a projection target onto which a projection image obtained based on the motion vector has been projected is photographed and a warped image which is an image generated by distorting an image obtained when the projection target is photographed by a perceptual amount of motion perceived when the projection result reproduction image is viewed, and a motion vector reduction unit configured to scale the motion vector using the first parameter.

Effects of the Invention

The present invention has an advantage of being able to automatically adjust a motion given to a projection target using a perceptual model.

BRIEF DESCRIPTION OF DRAWINGS

FIG. 6 is a diagram illustrating an example of a processing flow of the unnaturalness estimation unit according to the first embodiment.

FIG. 7 is a diagram showing an example of an algorithm for three-dimensionally smoothing parameters.

FIG. 11 is a diagram shoring an example of an algorithm for two dimensionally smoothing parameters.

DESCRIPTION OF EMBODIMENTS

Figure 1:
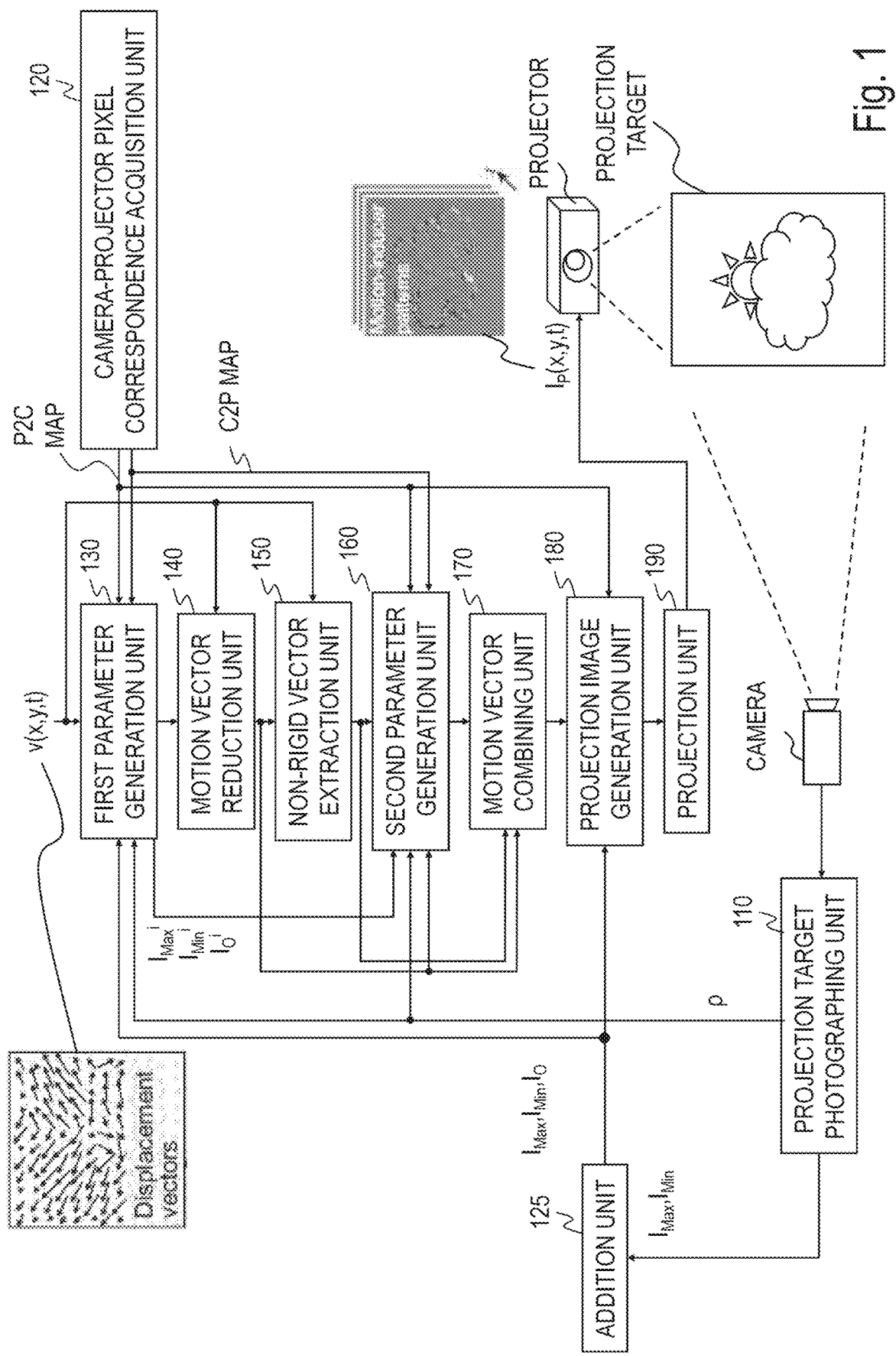
FIG. 1 is a functional block diagram of a projection image generation apparatus according to a first embodiment.

Hereinafter, embodiments of the present invention will be described. In the drawings used in the following description, the same reference signs are given to components having the same function or the steps of performing the same processing and duplicate description is omitted. In the following description, a symbol "^" or the like used in the text should originally be written direct above the character immediately before it, but is written immediately after the character due to a limitation of text notation. In Equations, such symbols are written in their original positions. It is assumed that processing performed for each element of a vector or a matrix is applied to all elements of the vector or the matrix unless otherwise specified.

First Embodiment

Figure 2:
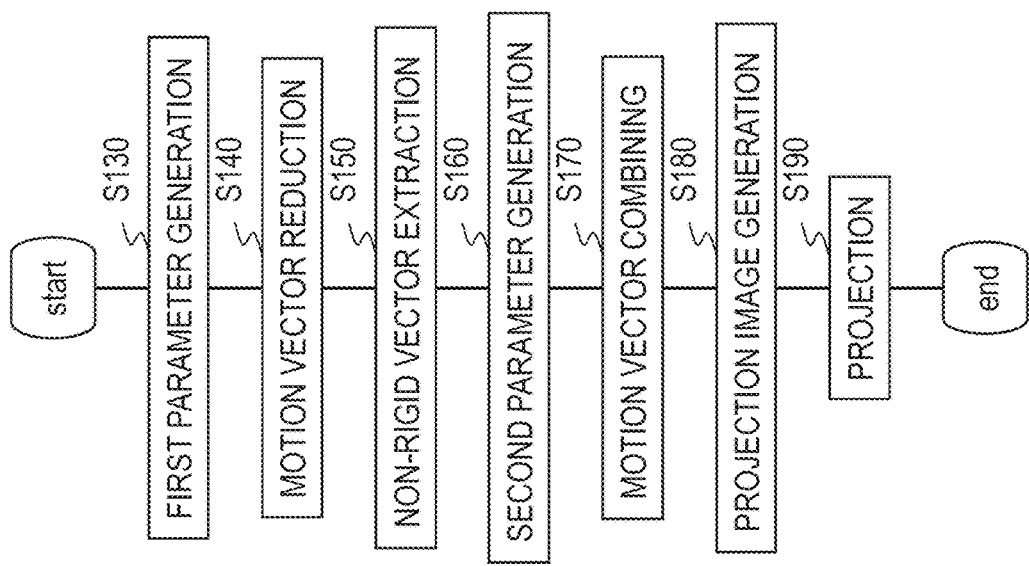
FIG. 2 is a diagram illustrating an example of a processing flow of the projection image generation apparatus according to the first embodiment.

FIG. 1 is a functional block diagram of a projection image generation apparatus according to a first embodiment and FIG. 2 illustrates a processing flow thereof.

The projection image generation apparatus includes a projection target photographing unit 110, a camera-projector pixel correspondence acquisition unit 120, an addition unit 125, a first parameter generation unit 130, a motion vector reduction unit 140, a non-rigid vector extraction unit 150, a second parameter generation unit 160, a motion vector combining unit 170, a projection image generation omit 180, and a projection unit 190.

An overview of the projection image generation apparatus will be described below. The projection image generation apparatus acquires an input image via a camera and tried in the projection target photographing unit 110. Apart from this, the projection image generation apparatus takes a motion vector $v(x, y, t)$ given to the projection target as an input. However, if a projection image is generated using the input motion vector as it is, the projection result may have an appearance aberration (unnaturalness) because the magnitude of the vector is too large. In order to prevent this, the first parameter generation unit 130 generates a parameter (hereinafter also referred to as a first parameter) $\lambda(x, y, t)$ for ring the motion vector $v(x, y, t)$ such that unnaturalness does not occur. However, simply ring the motion vector $v(x, y, t)$ titan makes an impression of motion given by the projection result very weak. Therefore, the non-rigid vector extraction unit 150 extracts a non-rigid motion vector component $\Delta v_h(x, y, t)$ included in the motion vector $v(x, y, t)$ and adds the extracted component to the motion vector to increase the magnitude of the motion vector. Here, to prevent the projection result from becoming unnatural again due to addition of the non-rigid motion vector component $\Delta v_h(x, y, t)$ to the reduced motion vector, the second parameter generation unit 160 generates a coefficient (hereinafter also referred to as a second parameter) $\lambda_2(x, y, t)$ for scaling the non-rigid motion vector component $\Delta v_h$. The motion vector combining unit 170 calculates $\lambda(x, y, t)v(x, y, t)+\lambda_2(x, y, t)\Delta v_h(x, y, t)$ as an optimal motion vector (hereinafter also referred to as a combined vector). The projection image generation tint 180 generates a projection image (a projection pattern) using the optimal motion vector. The projection unit 190 projects the generated projection image onto the projection target.

In the present embodiment, the projection target photographing unit 110 of the projection image generation apparatus includes a photographing device such as a camera and is configured to acquire an input innate captured by the photographing device. However, the projection tart photographing unit 110 may not include a photographing device and may be configured to receive an image captured by a photographing device which is a separate device as an input. Further, the projection unit 190 of the projection image generation apparatus includes a projection device such as a projector and is configured to project a generated projection image onto the projection target. However, the projection unit 190 may be configured to output the projection image to a projection device which is a separate device and this projection device may be configured to project the projection image onto the projection target. The present embodiment will be described assuring that the photographing device is a camera and the projection device is a projector.

The projection image generation appoints is, for example, a special apparatus formed by loading a special program into a known or dedicated computer having a central processing unit (CPU), a main storage device (a random access memory (RAM)), and the like. The projection image generation apparatus executes, for example, each proms under the control of the CPU. Data input to the projection image generation apparatus and data obtained through each process are stored, for example in the main storage device, and the data stored in the main storage device is read out to the central processing unit as needed and used for other processing. Each processing unit of the projection image generation apparatus many be at least partially configured by hardware such as a combined circuit. Each storage unit included in the projection image generation apparatus can be configured for example, by a main storage device such as a random access memory (RAM) or by middleware such as a relational database or a key-value store. However, each storage unit does not necessarily have to be provided inside the projection image generation apparatus and may be configured by a hand disk, an optical disc, or an auxiliary storage device formed of a semiconductor memory device such as a flash memory and may be provided outside the projection image generation apparatus.

Each unit will be described below.

Projection Target Photographing Unit 110

The projection target photographing unit 110 takes images captured by a camera included in the projection target photographing unit 110 as inputs and uses the input images to acquire and output a minimum luminance image $I_{Min}(x, y)$ and a maximum luminance image $I_{Max}(x, y)$ which are used as inputs to the first parameter generation unit 130 and the projection image generation unit 180. Here (x, y) represents the coordinates of each pixel.

The minimum luminance image $I_{Min}(x, y)$ can be acquired from an image that the camera has obtained by photographing the projection target when the projector projects minimum luminance toward the projection target.

The maximum luminance image $I_{Max}(x, y)$ can be acquired from an image that the camera has obtained by photographing the projection target when the projector projects maximum luminance toward the projection target.

The projection target photographing unit 110 stores the minimum and maximum luminance images $I_{Min}(x, y)$ and $I_{Max}(x, y)$ in a storage unit (not illustrated). The images are acquired in grayscale or are acquired in color and converted to grayscale and used in grayscale.

The luminance of an location in a region photographed by the camera is measured using a luminance meter or the like. A ratio ρ obtained by dividing a luminance value at this location by a corresponding pixel value of the camera is stored in the storage unit. Unnaturalness estimation units 134 and 165 in the first and second parameter generation units 130 and 160 use the ratio ρ when converting a pixel value of an image captured by the camera into a luminance value. Thus, it is desirable that the camera be corrected suds that the physical brightness (luminance) of the photographing target and the pixel value of the cognized image have a linear relationship.

Camera-Projector Pixel Correspondence Acquisition Unit 120

The camera-projector pixel correspondence acquisition unit 120 acquires and outputs the correspondence between a camera coordinate system and a projector coordinate system. For example, the camera-projector pixel correspondence acquisition unit 120 acquires and outputs mapping to the projector coordinates $(p_x, p_y)$ when viewed from the camera coordinates $(c_x, c_y)$ (a C2P map) and mapping to the camera coordinates $(c_x, c_y)$ when viewed from the projector coordinates $(p_x, p_y)$ (a P2C map). Map acquisition methods induce, for example, a method according to Reference 1 in which, while a projector projects a sequence of Gray code patterns, images that a camera has obtained by photographing the projection results are taken as inputs to decode the Gray code, thereby obtaining a C2P map.

(Reference 1) S. Inokuchi, K. Sato, and F. Matsuda, "Range-imaging for 3-D object recognition", in Proceedings of International Conference on Pattern Recognition, 1984, pp. 806-808.

The P2C map is obtained by referring back to coordinates $(c_x, c_y)$ in the C2P map to which the coordinates $(p_x, p_y)$ of the projector coordinate system are mapped. A defect in the P2C reap that occurs wines corresponding coordinates $(p_x, p_y)$ do not exist in the C2P map can be interpolated using a median value of the values of a range of surrounding 5 pixels×5 pixels or the like. The range of pixels used for interpolation is not limited to this and it is desirable that the range be adjusted according to the size of the defect. The P2C map is used in the first parameter generation unit 130, the second parameter generation unit 160, and the projection image generation unit 180. The C2P is used in the first and second parameter generation units 130 and 160.

Addition Unit 125

The addition unit 125 takes the minimum and maximum luminance images $I_{Min}(x, y)$ and $I_{Max}(x, y)$ as inputs and obtains and outputs an intermediate luminance image $I_0(x, y)$.

The addition unit 125 calculates a linear weighted-sum of the minimum and maximum luminance images $I_{Min}(x, y)$ and $I_{Max}(x, y)$ based on the following equation to obtain the intermediate luminance image $I_0(x, y)$.

[Math. 1]

$$I_0(x,y)=gI_{Max}(x,y)+(1-g)I_{Min}(x,y) \quad (1)$$

Here, g has a value in a range of [0, 1]. A final projection image is generated to give an impression of notion while preserving the appearance in color and shape of this intermediate luminance image $I_0(x, y)$. When g is 0, the final projection image gives an impression of motion while maintaining the appearance under ambient light excluding light kindle projector. However, in this case, the contrast polarity of the pattern of the projection target can only shift in the direction of bright→dark. Similarly, when g is 1, the contrast polarity of the patter of the projection target can only shift in the direction of dark→bright. In order for the contrast polarity to shift in both directions of bright→dark and dark→bright, g needs to be greater than 0 and less than 1. If the projected light is too strong relative to ambient light, the nasal appearance of the projection target may be impaired. This, in many cases, a value of g of about 0.1 to 0.3 can be said to be appropriate. However, it may be better to set g lager than this if the ambient light is very bright.

The intermediate luminance image $I_0(x, y)$ is output to the first parameter generation unit 130 and the projection image generation unit 180.

The above processes of the projection target photographing unit 110, the camera-projector pixel correspondence acquisition unit 120, and the addition unit 125 are performed before the notion vector v(x, y, t) is input to obtain the minimum luminance image $I_{Min}(x, y)$, the maximum luminance image $I_{Max}(x, y)$, the intermediate luminance image $I_0(x, y)$, the P2C map, the C2P map, and the ratio ρ.

First Parameter Generation Unit 130

The first parameter generation unit 130 takes the minimum luminance image $I_{Min}(x, y)$, the maximum luminance image $I_{Max}(x, y)$, the intermediate luminance image $I_0(x, y)$, and the notion vector v(x, y, t) as inputs, obtains a first parameter λ(x, y, t) using these inputs (S130), and outputs the first parameter λ(x, y, t). The first parameter is a parameter for soling the magnitude of the motion vector v(x, y, t). Here, t represents the flame number. The motion vector is also ailed a distortion map. Here, it is assumed that the ratio ρ, the P2C map, and the C2P map are input to and set in the first parameter generation unit 130 in advance before the mourn vector v(x, y, t) is input.

For example, the first parameter generation unit 130 geneses the first parameter λ(x, y, t) based on a perceptual difference d$^i$(t) between a projection result reproduction image I$_P^i$(x, y, t) which will be described later and an ideal distorted image without unnaturalness I$_{W(α)}^i$(x, y, t) which will be described later.

Figure 3:
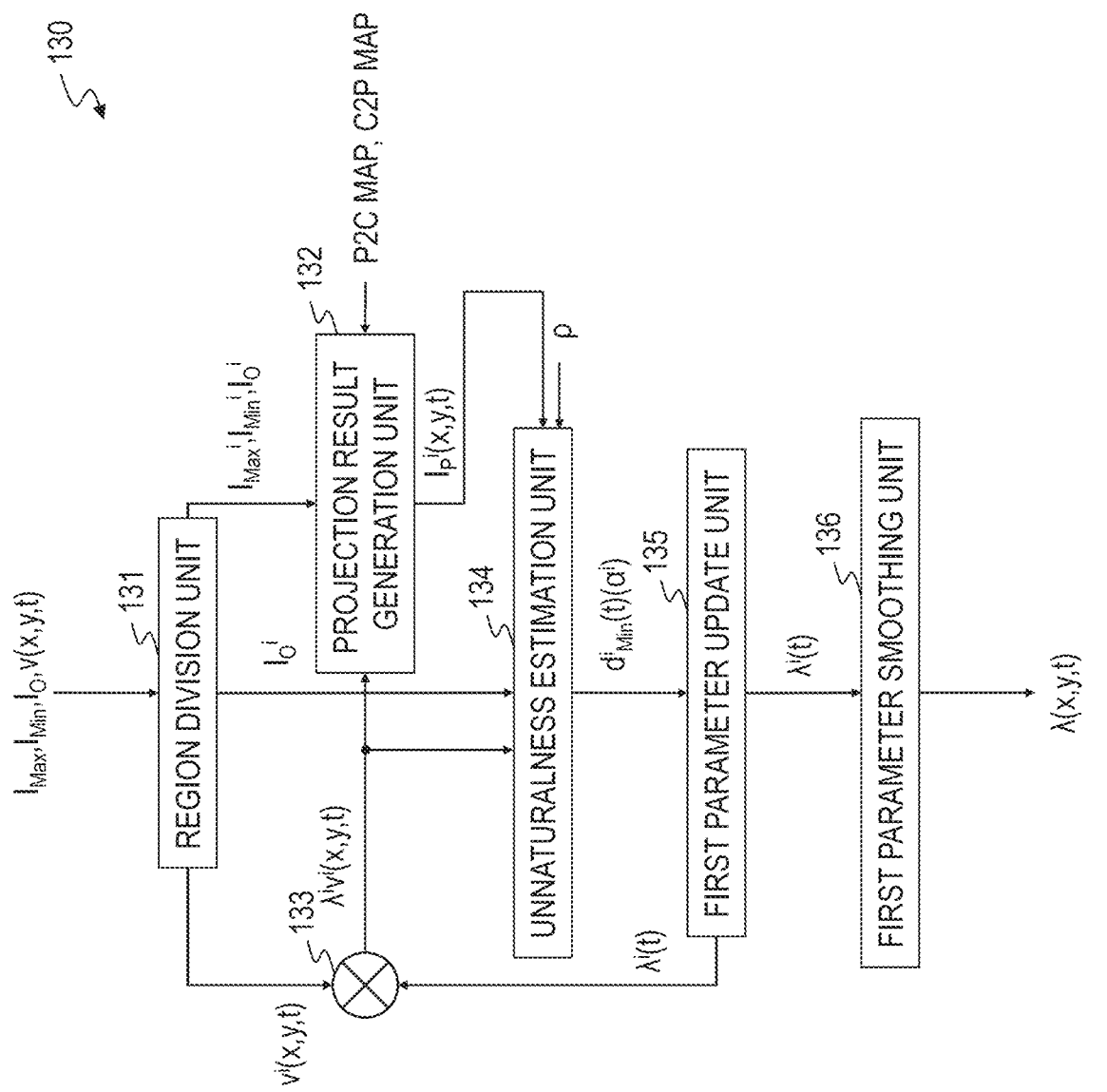
FIG. 3 is a functional block diagram of a first parameter generation unit according to the first embodiment.
Figure 4:
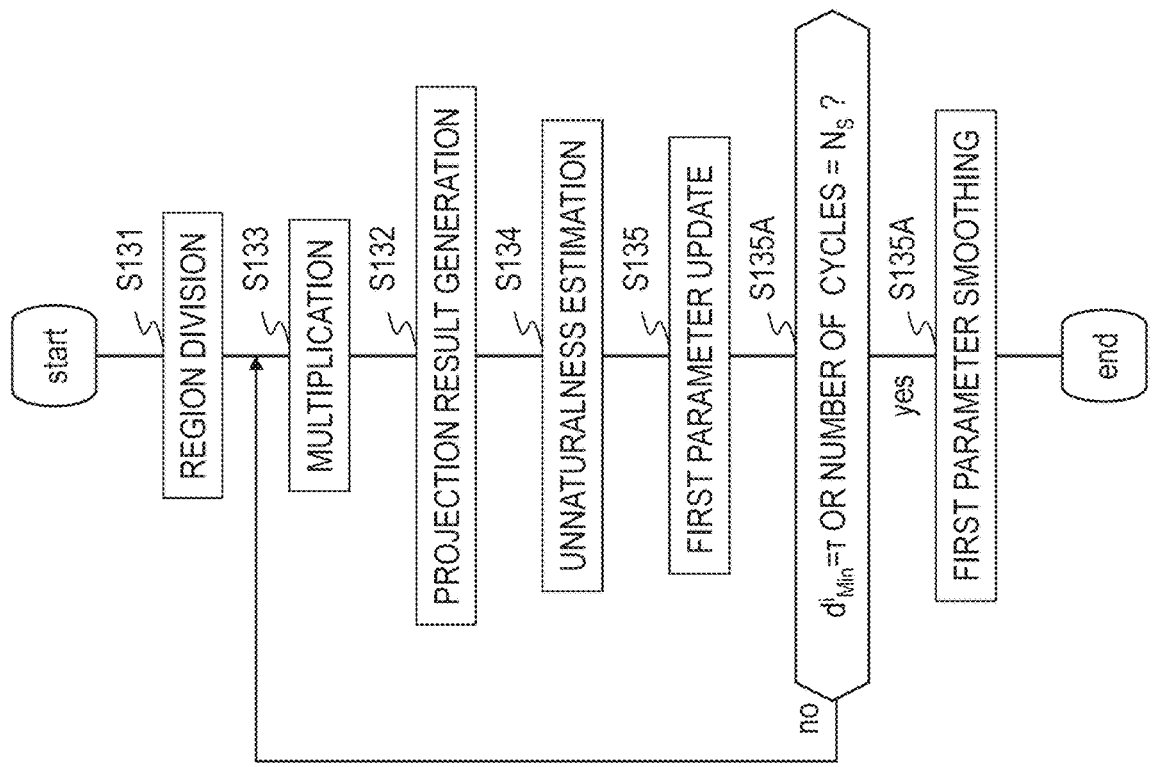
FIG. 4 is a diagram showing an example of a processing flow of the first parameter generation unit according to the first embodiment.

FIG. 3 is a functional block diagram of the first parameter generation unit 130 and FIG. 4 illustrates an example of a processing flow thereof. The first parameter generation unit 130 includes a region division unit 131, a projection result generation unit 132, a multiplication unit 133, an unnaturalness estimation unit 134, a first parameter update unit 135, and a first parameter smoothing unit 136.

Processing is performed in the following order. First processing is executed by the region division unit 131. That processing of a loop starting from the first parameter update unit 135 is performed in the order of the first parameter update unit 135→the multiplication unit 133→the projection result generation unit 132→the unnaturalness estimation unit 134→the first parameter update writ 135. When a certain condition is satisfied, the loop ads and the process staffs from the first parameter update unit 135 to the first parameter smoothing unit 136. The control of the loop is included in the processing of the first parameter update unit 135. Details will be described later.

Region Division Unit 131

The region division unit 131 takes the minimum luminance image I$_{Min}$(x, y), the maximum luminance image I$_{Max}$(x, y), the intermediate luminance image I$_0$(x, y), and the motion vector v(x, y, t) as inputs and divides each into a predetermined number of divisions or into small regions having a predetermined size (for example, 64 pixels×64 pixels) (S131). The sine of each small region is not limited to this, but needs to be large enough that a Laplacian pyramid which will be described later is generated within one region.

A region-divided minimum luminance image I$_{Min}^i$(x, y) and a region-divided minimum luminance image I$_{Max}^i$(x, y) are output to the projection result generation unit 132, a region-divided intermediate luminance image I$_0^i$(x, y) is output to the projection result generation unit 132 and the unnaturalness estimation unit 134, and a region-divided motion vector v$^i$(x, y, t) is output to the multiplication unit 133.

A set of the region-divided minimum luminance image I$_{Min}^i$(x, y), the region-divided maximum luminance image I$_{Max}^i$(x, y), and the region-divided intermediate luminance image I$_0^i$(x, y) is stored in a storage unit (not illustrated). The region-divided minimum luminance image I$_{Min}^i$(x, y), the region-divided maximum luminance image I$_{Max}^i$(x, y), and the region-divided intermediate luminance image I$_0^i$(x, y) stored in the storage unit are read and used by the projection result generation unit 162 and the unnaturalness estimation unit 165 of the second parameter generation unit 160.

The subsequent processing of the first parameter generation unit 130, except for that of the first parameter smoothing unit 136, is performed independently for each frame t of each region i. One first parameter λ$^i$(t) is output for each frame t of each region i, and when first parameters λ$^i$(t) are obtained for all regions/frames, they are collectively input to the first parameter smoothing unit 136.

Multiplication Unit 133

The multiplication unit 133 takes the region-divided motion vector v$^i$(x, y, t) and a currant first parameter λ$^i$(t) of the region i as inputs. A value output firm the first parameter update unit 135 is used as the current first parameter λ$^i$(t).

The multiplication unit 133 multiplies the region-divided motion vector v$^i$(x, y, t) by the anent first parameter λ$^i$(t) of the region i (S133) and outputs the product (vector λ$^i$(t)v$^i$(x, y, t)) to the projection result generation unit 132 and the unnaturalness estimation unit 134.

Projection Result Generation Unit 132

The projection result generation unit 132 takes the region-divided minimum luminance image I$_{Min}^i$(x, y), the region-divided maximum luminance image I$_{Max}^i$(x, y), the region-divided intermediate luminance image I$_0^i$(x, y), the motion vector λ$^i$(t)v$^i$(x, y, t) scaled by the arrant first parameter, the P2C map, and the C2P map as inputs and outputs a projection result reproduction image I$_P^i$(x, y, t) of the region i to which the current first parameter has been applied.

The projection result generation unit 132 generates the projection result reproduction image I$_P^i$(x, y, t) to which the current first parameter λ$_i$(t) has been applied as follows (S132). The projection result reproduction image is an image that is assumed to be obtained when the camera photographs the projection target onto which a projection image obtained based on the motion vector λ$^i$(t)v$^i$(x, y, t) has been projected. The projection result generation unit 132 obtains the projection result reproduction image through simulation on a computer.

The projection result generation unit 132 distorts the intermediate luminance image I$_0^i$(x, y) based on the motion vector λ$^i$(t)v$^i$(x, y, t) scaled by the current first parameter λ$^i$(t) to obtain a distorted image I$_W^i$(x, y, t). Any distortion method is applied. For example, the image is divided into grid cells having a size of 4 pixels×4 pixels, vertices are moved by motion vectors λ$^i$(t)v$^i$(x, y, t) corresponding to the coordinates of the vertices, and regions surrounded by the vertices are filled with the original images of squares while the original images of squares are stretched (or shrunk) ruing a bilinear interpolation method or the like. The cell size of the grid is not limited to 4 pixels×4 pixels and it is desirable that the image be divided at a resolution with a cell size which is smaller than the region size in image division of the region division unit 131 and is sufficient to express the characteristics of the motion vector v$^i$(x, y, t).

Next, the projection result generation unit 132 obtains an ideal projection image I$_M^i$(x, y, t) (a projection image without consideration of the physical restrictions of the projector used) for reproducing the distorted image I$_W^i$(x, y, t) using the following equation.

[Math. 2]

$$I_M^i(x, y, t) = \frac{I_W^i(x, y, t) - I_{Min}^i(x, y)}{I_{Max}^i(x, y) - I_{Min}^i(x, y)} \quad (2)$$

The value of I$_M^i$(x, y, t) obtained using Equation (2) is limited to a physically projectable range [0, 1] of the projector.

In order to reproduce the resolution of the projector, the projection result generation unit 132 maps the image obtained in the previous step to the projector coordinate system based on the P2C map and then maps it to the camera coordinate system again based on the C2P map. This makes the projection image coarse in the camera coordinate system according to the resolution of the projector. For accurate reproduction, the resolution of the camera needs to be sufficiently higher than the resolution of the projector. The image obtained here is Î$_M^i$(x, y, t).

Finally, the projection result generation unit 132 obtains the projection result reproduction image I$_P^i$(x, y, t) based on the following equation and outputs it to the unnaturalness estimation unit 134.

$$I_P^i(x,y,t) = \hat{I}_M^i(x,y,t) I_{Max}^i(x,y) + (1 - \hat{I}_M^i(x,y,t)) I_{Min}^i(x,y) \quad \text{[Math. 3]}$$

The projection result reproduction image I$_P^i$(x, y, t) represents the value of light emitted from the projector and can be obtained by linearly interpolating a pixel value of the region-divided minimum luminance image I$_{Min}^i$(x, y) and a pixel value of the region-divided maximum luminance image I$_{Max}^i$(x, y) using a pixel value of the image I$\hat{}_M^i$(x, y, t) as a weight.

Unnaturalness Estimation Unit 134
The unnaturalness estimation unit 134 takes the ratio ρ, the intermediate luminance image I$_0^i$(x, y), the projection result reproduction image I$_P^i$(x, y, t), and the motion vector λ$^i$(t) v$^i$(x, y, t) multiplied by the first parameter λ$^i$(t) as inputs, obtains an unnaturalness estimate d$^i_{Min}$(t) of the projection result using these inputs (S134), and outputs the unnaturalness estimate d$^i_{Min}$(t). The processing is performed independently for each region i and each frame t.

First Example of Unnaturalness Estimation
For example, the unnaturalness estimation unit 134 estimates the unnaturalness of the projection based on the method proposed in Non Patent Literature 1. An overview of the process will be briefly described below.

The unnaturalness estimation unit 134 outputs a minimum value d$^i_{Min}$(t) of the perceptual difference d$^i$(t) between the projection result reproduction image I$_P^i$(x, y, t) and the ideal distorted image without naturalness also refaced to as a warped image) I$_{W(α)}^i$(x, y, t) as an "unnaturalness of the projection result". Obtaining the minima value of the perceptual difference d$^i$(t) corresponds to obtaining a smallest value of the distance (a smallest distance) between a feature vector representing the perceptual representation of the warped image I$_{W(α)}^i$(x, y, t) and a failure vector representing the perceptual representation of the projection result reproduction image I$_P^i$(x, y, t) which are obtained by applying a perceptual model that will be described later. This "ideal distorted image without unnaturalness I$_{W(α)}^i$(x, y, t)" is generated by distorting the original intermediate luminance image I$_0^i$(x, y) by the "perceptual amours of motion α$^i$λ$^i$(t) v$^i$(x, y, t) perceived when the projection result reproduction image I$_P^i$(x, y, t) is viewed" on the computer. Here α$^i$ is a coefficient (hereinafter referred to as a third parameter) for sailing the input motion vector to make it correspond to the perceptual amount of motion. The third parameter α$^i$ is estimated as a value which minimizes the perceptual difference d$_i$(t) between the projection result reproduction image I$_P^i$(x, y, t) and the warped image I$_{W(α)}^i$(x, y, t). That is, the unnaturalness estimation unit 134 simultaneously estimates the third parameter α$^i$ that determines the "perceptual amount of motion perceived when the projection result reproduction image I$_P^i$(x, y, t) is viewed" and the unnaturalness estimate d$^i_{Min}$(t).

Figure 5:
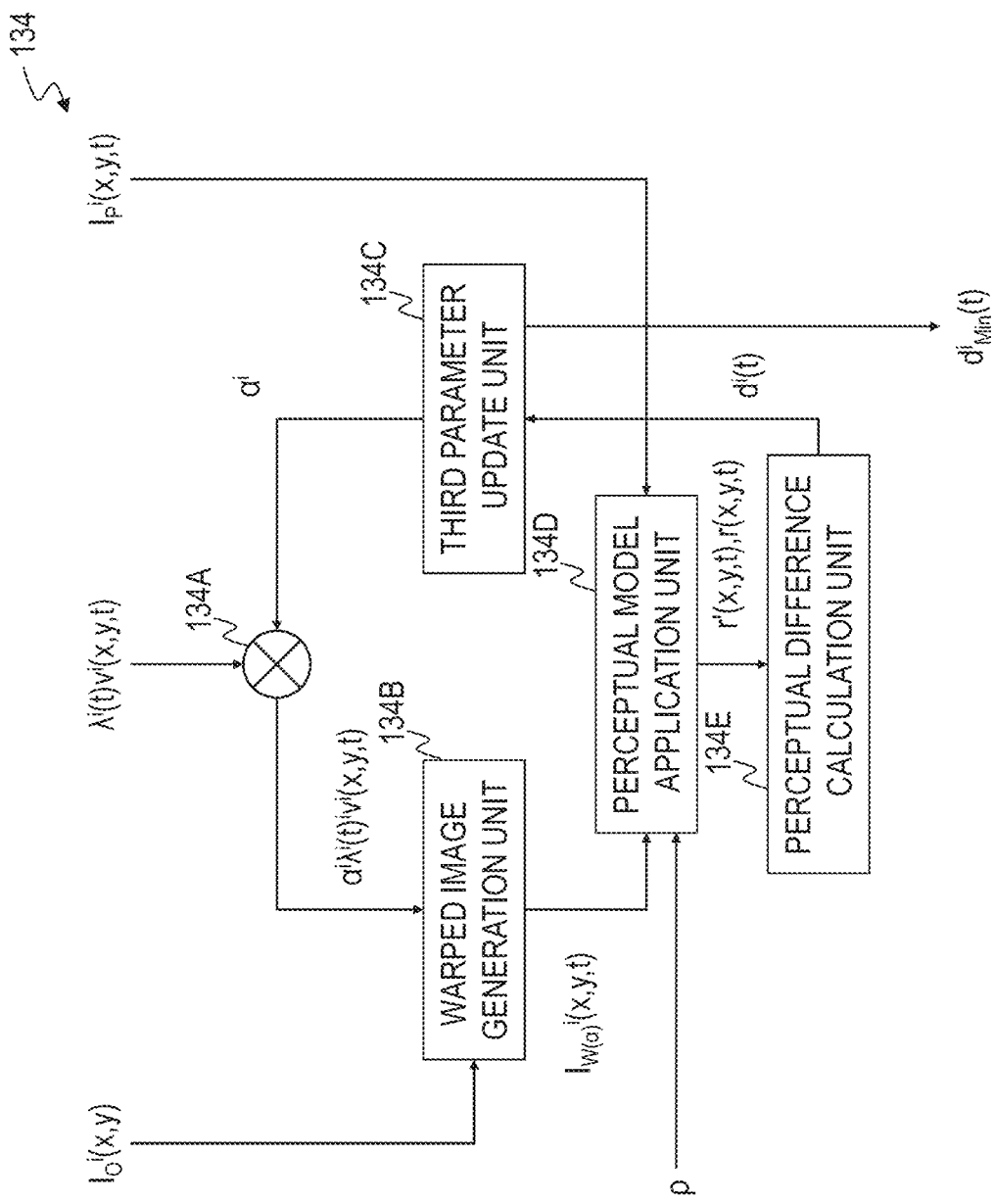
FIG. 5 is a functional block diagram of an unnaturalness estimation unit according to the first embodiment.

FIG. 5 is a functional block diagram of the unnaturalness estimation unit 134 and FIG. 6 illustrates an example of a processing flow thereof. As illustrated in FIG. 5, the unnaturalness estimation unit 134 includes a third parameter multiplication unit 134A, a warped image generation unit 134B, a third parameter update unit 134C, a perceptual model application unit 134D, and a perceptual difference calculation unit 134E. Processing is performed in the following order. Processing of a loop starting from the third parameter update unit 134C is performed in the order of the third parameter update unit 1340→the third parameter multiplication unit 134A→the warped image generation unit 134B→the perceptual model application unit 134D→the perceptual difference calculation unit 134E→the third parameter update unit 134C. When a certain condition is satisfied, the loop ends and the third parameter update unit 134C outputs the unnaturalness estimate d$^i_{Min}$(t) to the first parameter update unit 135. The control of the loop is included in the processing of the third parameter update unit 1340. Hereinafter, the process will be described in order.

Third Parameter Multiplication Unit 134A
The third parameter multiplication unit 134A takes the motion vector λ$^i$(t)v$^i$(x, y, t) multiplied by the first parameter λ$^i$(t) and the current third parameter α$^i$ as inputs. A value output from the third parameter update unit 1340 is used as the current third parameter α$^i$.

The third parameter multiplication unit 134A multiplies the motion vector λ$^i$(t)v$^i$(x, y, t) multiplied by the first parameter λ$^i$(t) by the current third parameter α$^i$ (S134A) and outputs the product (vector α$^i$λ$^i$(t)v$^i$(x, y, t)) to the warped image generation unit 134B.

Warped Image Generation Unit 134B
The warped image generation unit 134B takes the intermediate lumina ice image I$_O^i$(x, y) and the motion vector α$^i$λ$^i$(t)v$^i$(x, y, t) scaled by the first and third parameters as inputs, distorts the intermediate luminance image I$_O^i$(x, y) based on the motion vector α$_i$λ$^i$(t)v$^i$(x, y, t) to obtain a warped image I$_{W(α)}^i$(x, y, t), and outputs the warped image I$_{W(α)}^i$(x, y, t) (S134B). Any distortion method is applied. For example, the image is divided into grid cells having a size of 4 pixels×4 pixels, vertices are moved by vectors α$^i$λ$^i$(t) v$^i$(x, y, t) corresponding to the coordinates of the vertices, and regions surrounded by the vertices are filled with the original images of squares while the original images of squares are stretched (or shrank) using a bilinear interpolation method or the like. The cell sire of the grid is not limited to 4 pixels×4 pixels and it is desirable that the image be divided at a resolution with a cell size which is smaller than the region size in image division of the region division unit 131 and is sufficient to express the characteristics of the motion vector v$^i$(x, y, t).

Perceptual Model Application Unit 134D
The perceptual model application unit 134D takes the warped image I$_{W(α)}^i$(x, y, t), the projection result reproduction image I$_P^i$(x, y, t), and the ratio ρ as inputs and obtains and outputs a perceptual response r'(x, y, t) to the warped image I$_{W(α)}^i$(x, y, t) and a perceptual response r(x, y, t) to the projection result reproduction image I$_P^i$(x, y, t).

Because the perceptual model application unit 134D independently performs the same processing an the warped image I$_{W(α)}^i$(x, y, t) and the projection result reproduction image I$_P^i$(x, y, t), each of the input images (the warped image I$_{W(α)}^i$(x, y, t) and the projection result reproduction image I$_P^i$(x, y, t)) will be hereinafter referred to as I(x, y) (where the indices i and t indicating the region and the frame are omitted for the sake of simplicity). The perceptual model application unit 134D applies the perceptual model to the input image to obtain the perceptual response (S134D). In the present embodiment, a model that models up to the primary visual cortex corresponding to an initial stage of the human visual system is adopted as a perceptual model. This model that models up to the primary visual cortex takes an image as an input and outputs a response to the input image at spatial frequency components and orientation components of each pixel (region) of the input image (a result of simulating the response of nerve cells). This model can also be said to be a model for obtaining a feature vector representing the perceptual representation of the warped image $I_{W(\alpha)}{}^i(x, y, t)$ and a feature vector representing the perceptual representation of the projection result reproduction image $I_P{}^i(x, y, t)$. First, this model uses a linear filter to decompose the input image into a plurality of spatial frequency bands and orientations. Next, the model non-linearly corrects (controls the gains of) values, corresponding to each pixel, of the components obtained through decomposition and outputs the corrected values as the response described above. However, the present embodiment, for example, omits the process of analyzing the orientation components of the image in consideration of calculation speed. The model of the perceptual response is not limited to the implementation described here, and a model including the analysis of orientation components or a model that reproduces a response of the higher-order visual cortex may be used.

(Processing 1) First, the pixel value of the input image I(x, y) is multiplied by the ratio ρ acquired by the projection target photographing unit 110 to convert the pixel value into a luminance unit. Here, the input image converted into the luminance unit is converted into a just noticeable difference (JND) scale image L(x, y) using a method described in Reference 2.

(Reference 2) R. Mantiuk, S. J. Daly, K. Myszkowski, and H.-P. Seidel, "Predicting visible differences in high dynamic range images model and its calibration". In Proceedings of SPIE, vol. 5666, pp. 204-214, 2005.

In the JND scale, the luminance is mapped such that a aluminance change corresponding to a threshold above which thaws are perceivable is defined as 1. That is, when Ψ(L) is defined as a function that converts the JND scale value L into luminance, the following equation is obtained.

[Math. 4]
$$\frac{d\psi(L)}{dl} = tvi(\psi(L)) \quad (3)$$

Here, tvi is a function that gives a threshold of the luminance change for adaptive luminance. The present embodiment uses the following equation for tvi as leaned from Reference 2.

[Math. 5]
$$tvi(Y) = \frac{Y}{\pi_1\left(\left(\frac{\pi_2}{Y}\right)^{\pi_3} + 1\right)^{-\pi_4}}$$

Here, $(\pi_1, \pi_2, \pi_3, \pi_4) = (30.162, 4.0627, 1.66596, 0.2712)$ and Y is the adaptive luminance. In practice, it is necessary to obtain and use the inverse function of Ψ, that is, the function $\Psi^{-1}$ that converts luminance into a JND scale value. Because Ψ is a monotonically increasing function, $\Psi^{-1}$ can be uniquely obtained. In the present embodiment, Ψ is obtained as a numerical solution of Equation (3) and stored in a lockup table, and a JND scale value is obtained from luminance by referring to the lookup table. The lookup table stores values that are discrete to some extent in order to save storage space, and when intermediate values between them are obtained, sufficient results can be obtained using linear interpolation.

(Processing 2) Next, a Laplacian pyramid is generated from the JND scale image L(x, y) and a plurality of bandpass images $b_0(x, y), b_1(x, y), b_2(x, y), \ldots,$ and $b_{N-1}(x, y)$ are obtained. In the present embodiment, the number of bandpass images N=5. However, the value of N is not limited to this and it is considered better to increase N as the projection target is photographed at a higher resolution. Normally, when a Laplacian pyramid is generated, the resolution decreases toward a bandpass image in a lower spatial frequency band due to downsampling. However, in the present embodiment, downsampling is not performed in order to improve the accuracy.

(Processing 3) Next, in order to reproduce the sensitivity of the visual system to each spatial frequency band, the bandpass images $b_j(x, y)$ (j=0, 1, 2, ..., N−1) of the Laplacian pyramid are weighted to obtain weighted bandpass images as follows.

[Math. 6]
$$c_j(x,y) = w_j b_j(x,y), j=0,1,2,\ldots N-1 \quad (4)$$

Here, the weight $w_j$ is represented by the following function.

[Math. 7]
$$w_j = \exp\left\{-\left(\frac{N-1-j}{s}\right)^\theta\right\} \quad (5)$$

Here, s and θ are constants that determine the shape of the weighting function. In the present embodiment, the constants were determined such that (s, θ)=(0.75, 3.0) through fining to experimental data. However, the weight function is not limited to this and the parameters may be reset according to observation conditions or the like.

(Processing 4) Finally, in order to reproduce contrast gain adjustment of the visual system, the weighted bandpass image $c_j(x, y)$ is converted into a perceptual response $r_j(x, y)$ using the following equation.

[Math. 8]
$$r_j(x, y) = \text{sign}(c_j(x, y))\frac{|c_j(x, y)|^p}{c_j(x, y)^2 + \sigma^2} \quad (6)$$

Here, p and σ are constants that determine the shape of the contrast gain adjustment function. In the present embodiment, the constants were determined such that (p, σ)=(2.38, 0.156) through fitting to experimental data sign (z) is a function representing the sign of z, which is −1 if z<0 and +1 if z>0. The contest gain adjustment friction is not limited to this, and any function may be used as long as it can approximate the response of the visual system.

The above processing is performed for each of the warped image $I_{W(\alpha)}{}^i(x, y, t)$ and the projection result reproduction image $I_P{}^i(x, y, t)$ to obtain a perceptual response $r'_j{}^i(x, y, t)$ to the warped image $I_{W(\alpha)}{}^i(x, y, t)$ and a perceptual response $r_j{}^i(x, y, t)$ to the projection result reproduction image $I_P{}^i(x, y, t)$ and the obtained perceptual responses are output to the perceptual difference catenation unit 134E. A vector having the perceptual response $r'_j{}^i(x, y, t)$ as elements is the feature vector representing the perceptual representation of the warped image $I_{W(\alpha)}{}^i(x, y, t)$ described above and a vector having the perceptual response $r_j{}^i(x, y, t)$ as elements is the feature vector representing the perceptual representation of the projection result reproduction image $I_P{}^i(x, y, t)$ described above.

Perceptual Difference Calculation Unit 134E

The perceptual difference calculation unit 134E takes the perceptual response $r'^i_j(x, y, t)$ to the warped image and the perceptual response $r^i_j(x, y, t)$ to the projection result reproduction image as inputs and obtains and outputs a distance $d^i(t)$ between the input perceptual responses.

The perceptual difference calculation unit 134E calculates the distance $d^i(t)$ between the perceptual responses using the following equation (S134E).

[Math. 9]

$$d^i(t) = \ln\left[\sqrt{\frac{\Sigma_{x,y}\Sigma_j\{r^i_j(x, y, t) - r'^i_j(x, y, t)\}^2}{N_x N_y}}\right] \quad (7)$$

Here $N_x$ and $N_y$ represent the horizontal and vertical sines dune perceptual response $r^i_j(x, y, t)$ or $r'^i_j(x, y, t)$, respectively. The perceptual responses $r^i_j(x, y, t)$ and $r'^i_j(x, y, t)$ have the same size. In Equation (7), ln is a function that calculates the natural logarithm. The distance calculation method is not limited to this, and for example, a normal Euclidean distance or a Manhattan distance may be used. In order to tolerate some errors in the estimation of perceptual motion, the perceptual responses $r^i_j(x, y, t)$ and $r'^i_j(x, y, t)$ may be spatially pooled into local regions of $p_x$ pixels×$p_y$ pixels such that their size is reduced to $1/p_x$ and $1/p_y$ in the horizontal and vertical directions and then may be substituted into Equation (7). In the present embodiment, $p_x = p_y = 2$.

Third Parameter Update Unit 134C

The third parameter update unit 134O controls a process of searching for the third parameter. For example, the third parameter update unit 134C searches for a third parameter which minimizes the perceptual difference $d^i(t)$ obtained by the perceptual difference calculation unit 134E. In other words, the third parameter update unit 134O estimates the third parameter as a value (a coefficient for scaling the motion vector) which minimizes the distance between a feature vector representing the perceptual representation of the warped image $I_{W(\alpha)}^i(x, y, t)$ (a vector having the perceptual response $r'^i_j(x, y, t)$ as dements) and a feature vector representing the perceptual representation of the projection result reproduction image $I_P^i(x, y, t)$ (a vector having the perceptual response $r^i_j(x, y, t)$ as elements). Here, an example in which a golden section search method is used to search for the third parameter will be described, although another search algorithm, for example, a ternary search method, may be used.

The third parameter update unit 134C takes a perceptual difference $d^i(t)$ obtained with a third parameter of the previous cycle as an input and outputs the third parameter $\alpha^i$ of the next cycle. However, in the first cycle the third parameter update unit 134C performs only the output because there is no input. In the final cycle, the third parameter update unit 134C outputs the minimum perceptual difference $d^i(t)$ as an unnaturalness estimate $d^i_{Min}(t)$.

The third parameter update unit 134C updates the third parameter such that the perceptual difference $d^i(t)$ becomes smaller (S134C).

The thin parameter update unit 134C uses, for example, the golden section search method. First, the third parameter update unit 134C defines $L(k)$ and $H(k)$ as lower and upper limits of a search section in a kth cycle. In the golden section search method, the third parameter update unit 134C chides the search section at two points into three sections and compares outputs (the perceptual differences $d^i(t)$ in this example) of the function wren values of the division points (values of the third parameter in this example) are taken as inputs and shortens the search section. Then, the third parameter update unit 134C defines the smaller of the two division points in the kth cycle as $A(k)$, the larger as $B(k)$, the perceptual difference of $A(k)$ as $d_A(k)$, and the perceptual difference of $B(k)$ as $d_B(k)$. Also, $\phi$ is defined such that $\phi=(1+\sqrt{5})/2$.

(When k=0)
The third parameter update unit 134C sets $(L(0), H(0))$ and $(A(0), B(0))$ such that $(L(0), H(0))=(0, 1)$ and $(A(0), B(0))=(1/(1+\phi), \phi/(1+\phi))$ and outputs the third parameter of the first cycle $\alpha^i(0)=A(0)$ to the third parameter multiplication unit 134A The values of $L(0), H(0), A(0)$, and $B(0)$ are stored in the storage unit.

(When k=1)
The third parameter update unit 134C sets $(L(1), H(1), A(1), B(1))$ such that $(L(1), H(1), A(1), B(1))=(L(0), H(0), A(0), B(0))$ and outputs the third parameter of the next cycle $\alpha^i(1)=B(1)$ to the third parameter multiplication unit 134A. Also, $d_A(1)=d^i(t)$ is stored in the storage unit.

(When k=2)
The input perceptual difference is stored in the storage unit as $d_B(1)=d^i(t)$.

(2-i) When $d_A(1)<d_B(1)$
The third parameter update unit 134C sets a new search section as $(L(2), H(2))=(L(1), B(1))$ and sets new division points as $(A(2), B(2))=((\phi L(2)+H(2))/(1+\phi), A(1))$. Also, $d_B(2)=d_A(1)$ is stored in the storage unit. The third parameter of the next cycle is set as $\alpha^i(2)=A(2)$, stored in the storage unit, and output to the third parameter multiplication unit 134A.

(2-ii) When $d_A(1)>d_B(1)$
The third parameter update unit 134C sets a new search section as $(L(2), H(2))=(A(1), H(1))$ and sets new division points as $(A(2), B(2))=(B(1), (L(2)+\phi H(2))/(1+\phi))$. Also, $d_A(2)=d_B(1)$ is stored in the storage unit. The third parameter of the next cycle is stored in the storage unit as $\alpha^i(2)=B(2)$ and output to the third parameter multiplication unit 134A.

(When k≥3)
When $\alpha^i(k-1)=A(k-1)$, the third parameter update unit 134C stores the input perceptual difference in the storage unit as $d_A(k-1)=d^i(t)$. When $\alpha^i(k-1)=B(k-1)$, the third parameter update unit 134C stores the input perceptual difference in the storage unit as $d_B(k-1)=d^i(t)$. Similar to when k=2, the subsequent pressing is as follows.

(3-i) When $d_A(1)<d_B(1)$
The third parameter update unit 134C sets a new search section as $(L(k), H(k))=(L(k-1), B(k-1))$ and sets new division points as $(A(k), B(k))=((\phi L(k)+H(k))/(1+\phi), A(k-1))$. Also, $d_B(k)=d_A(k-1)$ is stored in the storage unit. The third parameter of the neat cycle is stored in the storage unit as $\alpha^i(k)=A(k)$ and output to the third parameter multiplication unit 134A.

(3-ii) When $d_A(1)>d_B(1)$
The third parameter update unit 134C sets a new search section as $(L(k), H(k))=(A(k-1), H(k-1))$ and sets new division points as $(A(k). B(k))=(B(k-1), (L(k)+\phi H(k))/(1+\phi))$. Also, $d_A(k)=d_B(k-1)$ is stored in the storage unit. The third parameter of the next cycle is stored in the storage unit as $\alpha^i(k)=B(k)$ and output to the third parameter multiplication unit 134A.

In any of the above (3-i) and (3-ii), the search ends when the width $H(k)-L(k)$ of the search section becomes less than a constant value $\tau_\alpha$ (S134C-2), and $d^i_{Min}(t)$ is set as $d^i_{Min}(t)=d_A(k-1)$ if $d_A(k-1)<d_B(k-1)$ and is set as $d^i_{Min}(t)=d_B(k-1)$ if $d_A(k-1)>d_B(k-1)$ and output from the unnaturalness estimation unit 134. This is output to the first parameter update unit 135 when the unnaturalness estimation unit is used in the first parameter generation unit 130 (as the unnaturalness estimation unit 134) and output to the second parameter update unit 166 when the unnaturalness estimation unit is used in the second parameter generation unit 160 (as the unnaturalness estimation unit 165). As $\tau_\alpha$ decreases, the estimation accuracy increases, but the calculation cost also increases. In the present embodiment, $\tau_\alpha=0.05$.

Second Example of Unnaturalness Estimation

A model (which is also called a perceptual model in the second example of unnaturalness estimation) that takes the warped image $I_{W(\alpha)}^i(x, y, t)$ and the projection result reproduction image $I_P^i(x, y, t)$ as inputs and directly outputs the perceptual difference may also be used to obtain the perceptual difference $d^i(t)$. That is, the perceptual difference $d^i(t)$ is obtained directly from the warped image $I_{W(\alpha)}^i(x, y, t)$ and the projection result reproduction image $I_P^i(x, y, t)$, rather than obtaining a perceptual response $r_j^{\prime i}(x, y, t)$ to the warped image and a perceptual response $r_j^i(x, y, t)$ to the projection result reproduction image to obtain the distance $d^i(t)$ between them as in the first example of unnaturalness estimation.

In this example, the unnaturalness estimation unit 134 does not include the perceptual difference calculation unit 134E, and the perceptual model application unit 134D takes the warped image $I_{W(\alpha)}^i(x, y, t)$ and the projection result reproduction image $I_P^i(x, y, t)$ as inputs, applies values of these images to the perceptual model to obtain the perceptual difference $d^i(t)$ (S134D, S134E), and outputs the obtained perceptual difference $d^i(t)$. The processing of the other parts of the unnaturalness estimation unit 134 is similar to that of the first example of unnaturalness estimation.

In the processing of the third parameter update unit 1340 in the estimation of this example, a feature vector representing the perceptual representation of the warped image $I_{W(\alpha)}^i(x, y, t)$ and a feature vector representing the perceptual representation of the projection result reproduction image $I_P^i(t, y, t)$ or the distance between them is not obtained. Instead, the third parameter update unit 134C estimates, as a result of its processing, the third parameter as a value (a coefficient for scaling the motion vector) which minimizes the distance between a feature vector representing the perceptual representation of the warped image $I_{W(\alpha)}^i(x, y, t)$ and a feature vector representing the perceptual representation of the projection result reproduction image $I_P^i(x, y, t)$.

Similarly, in the estimation of this example, as a result of the processing of the unnaturalness estimation unit 134, a smallest value (a smallest distance) of the distance between a feature vector wing the perceptual representation of the warped image $I_{W(\alpha)}^i(x, y, t)$ and a feature vector representing the perceptual representation of the projection result reproduction image $I_P^i(x, y, t)$ is obtained as a minimum value of the perceptual difference $d^i(t)$.

First Parameter Update Unit 135

The first parameter update unit 135 controls a process of searching for the first parameter. For example, the first parameter update unit 135 searches for a first parameter at which the unnaturalness estimate $d^i_{Min}(t)$ obtained by the unnaturalness estimation unit 134 is closest to a predetermined threshold $\tau$. The value of $\tau$ may be set to a fixed threshold in advance or a user-adjustable interface may be provided. In the present embodiment, it is empirically determined that $\tau=-2.28$. For example, a binary search method is used to search for the first parameter.

The first parameter update unit 135 takes an unnaturalness estimate $d^i_{Min}(t)$ obtained with a first parameter of the previous cycle as an input and outputs the first parameter $\lambda^i(t)$ of the next cycle. However, in the first cycle, the first parameter update unit 135 performs only the output because there is no input.

The first parameter update unit 135 updates the first parameter $\lambda^i(t)$ such that the unnaturalness estimate $d^i_{Min}(t)$ is closest to the predetermined threshold $\tau$ (S135).

First, in the first cycle, the first parameter update unit 135 stores $\lambda^i(t)=0.5$ and a step size of stp=0.25 in the storage unit and outputs $\lambda^i(t)$ to the multiplication unit 133.

In the subsequent cycles, the first parameter update unit 135 updates $\lambda^i(t)$ as follows based on a result of comparison between the input unnaturalness estimate $d^i_{Min}(t)$ and the threshold $\tau$.

When $d^i_{Min}(t)<\tau$, the first parameter update unit 135 updates the first parameter such that $\lambda^i=\lambda^i(t)+$stp and stores the updated first parameter in the storage unit.

When $d^i_{Min}(t)>\tau$, the first parameter update unit 135 updates the first parameter such that $\lambda^i(t)=\lambda^i(t)-$stp and stores the updated first parameter in the storage unit.

When a predetermined condition is satisfied (yes of S135A), for example, when $d^i_{Min}(t)\le\tau$ or the number of cedes is $N_S$, the first parameter update unit 135 ends the search and outputs $\lambda^i(t)$ to the first parameter smoothing unit 136. In other cases (no in S135A), the first parameter update unit 135 updates the step side such that stp=stp/2 and stores it in the storage unit and outputs $\lambda^i(t)$ to the multiplication unit 133.

First Parameter Smoothing Unit 136

The first parameter smoothing unit 136 takes the first parameter $\lambda^i(t)$ obtained from each region/frame as an input, smooths the input first parameter $\lambda^i(t)$, and outputs the smoothed first parameter $\lambda(x, y, t)$ of each pixel (S136). For example, the first parameter smoothing unit 136 spatially and temporally smooths the first parameter $\lambda^i(t)$ obtained from each region/frame using the following:

(i) First parameters obtained from regions spatially adjacent to the region i and the frame t.
(ii) First parameters obtained from the region i and frames temporally adjacent to the frame t.
(iii) First parameters obtained from regions spatially adjacent to the region i and frames temporally adjacent to the frame t.

The first parameter of each region/frame will be referred to as $\lambda(m, n, t)$ for the sake of explanation. Here, m represents the horizontal position of the region, n represents the vertical position of the region, and t represents the time flame to which the region belongs. First, smoothing is performed such that extreme value changes do not occur between adjacent first parameters $\lambda(m, n, t)$. At this time, smoothing is performed by replacing $\lambda(m, n, t)$ with $\lambda'(m, n, t)$ such that the following two constraints are satisfied.

Constraint 1: $\lambda'(m, n, t)\le\lambda(m, n, t)$ must be satisfied for all m, n, and t. This restricts the unnaturalness from exceeding an unnaturalness threshold due to the smoothing process.

Constraint 2: The following mist be satisfied for all m, n, and t.

$$|\lambda'(m,n,t)-\lambda'(m',n',t')|\le\sqrt{(|m-m'|^2+|n-n'|^2)s_s^2+|t-t'|^2s_t^2} \quad \text{[Math. 10]}$$

Here, (m', n', t') represents a set of regions around (m, n, t), where $m'\in\{m-1, m, m+1\}$, $n'\in\{n-1, n, n+1\}$, and $t'\in\{t-1, t, t+1\}$. In addition, $s_s$ and $s_t$ are permissible values for the magnitude of the gradient between adjacent regions. These values need to be set sufficiently small because it is required that the first parameter not qualitatively change the input original motion vector (such that a rigid motion remains rigid). In the present embodiment, $(s_s, s_t)=(0.06, 0.03)$. It is desirable that these values be adjusted according to the region size and the frame rate for projection. In other words, $s_s$ may increase as the region size increases and st may increase as the frame rate decreases. In the present embodiment, it is assumed that the region size is 641 pixels×64 pixels and the franc rate is 60 FPS.

The preset embodiment uses the method described in Reference 3 as an algorithm for updating $\lambda(m, n, t)$ such that the above constraints are satisfied.

(Reference 3) A Majumder and R. Stevens, "Perceptual photometric seamlessness in projection-based tiled displays", ACM Transactions on Graphics, 24(1): 118-139, 2005.

However, the present embodiment extends the algorithm to perform three-dimensional smoothing, while Reference 3 only performs two-dimensional smoothing of parameters. FIG. 7 shows an example of a specific processing algorithm A basic processing flow involves scanning the values of $\lambda(m, n, t)$ of regions in order and updating the values of $\lambda$ such that the above constraints 1 and 2 are satisfied. The update method follows the following procedure.

1. Differences between the current region and 11 regions in the scanning and opposite directions among 26 regions spatiotemporally adjacent to the currant region (value of current region−values of adjacent regions) are calculated.

2. If the difference calculated in the above step 1 is larger than the restricted value on the right side of the constraint 2, the value of the current region is reduced until the difference becomes equal to the value on the right side.

The procedure of steps 1 and 2 above is performed for a set of all possible scanning directions. Specifically, when a set of scanning directions on the horizontal axis, the vertical axis, and the time axis is expressed by $(d_m, d_n, d_t)$ and the two directions on each axis are expressed by $\{-1, 1\}$, a set of eight scanning directions $(d_m, d_n, d_t)=[(-1,-1,-1),(1,-1,-1),(-1,1,-1),(1,1,-1),(-1,-1,1),(1,-1,1),(-1,1,1),(1,1,1)]$ is scarred.

After smoothing is completed for each region (m, n, t), a process of spreading the value over pixels (x, y, t) is performed. In the present embodiment, a process of expanding the first parameter $\lambda'(m, n, t)$ of each region through bilinear interpolation is performed for each frame t to obtain the first parameters $\lambda(x, y, t)$ of pixels. The interpolation method used for expansion is not limited to this, and for example, bicubic interpolation or the like may be used. The obtained $\lambda(x, y, t)$ is output to the differential motion vector calculation unit, the second parameter generation unit 160, and the motion vector combining unit 170.

Motion Vector Reduction Unit 140

The motion vector reduction unit 140 takes the first parameter $\lambda(x, y, t)$ and the motion vector v(x, y, t) as inputs, multiplies the motion vector v(x, y, t) by the first parameter $\lambda(x, y, t)$ to obtain a reduced motion vector $v_s(x, y, t)=\lambda(x, y, t)v(x, y, t)$ (S140), and outputs the reduced motion vector $v_s(x, y, t)$ to the non-rigid vector extraction unit 150, the second parameter generation unit 160, and the motion vector combining unit 170.

Non-Rigid Vector Extraction Unit 150

The non-rigid vector extraction unit 150 takes the motion vector v(x, y, t) and the reduced motion vector $v_s(x, y, t)$ as inputs, extracts a non-rigid motion vector component $\Delta v_h(x, y, t)$ included in the difference between the motion vector v(x, y, t) and the reduced motion vector $v_s(x, y, t)$ (S150), and outputs the extracted non-rigid motion vector component $\Delta v_h(x, y, t)$ to the second parameter generation unit 160 and the motion vector combining unit 170. For example, the non-rigid vector extraction unit 150 includes a differential motion vector calculation unit and a filtering unit (not illustrated). The non-rigid motion vector component $\Delta v_h(x, y, t)$ corresponds to a high-pass component (a high spatial frequency component) of the motion vector v(x, y, t) and the filtering unit functions as a high-pass filter.

Differential Motion Vector Calculation Unit

The differential motion vector calculation unit takes the motion vector v(x, y, t) and the reduced motion vector $v_s(x, y, t)$ as inputs, calculates a motion vector difference $\Delta v(x, y, t)=v(x, y, t)-v_s(x, y, t)$, and outputs it to the filtering unit.

Filtering Unit

The filtering unit takes the motion vector difference $\Delta v(x, y, t)$ as an input and obtains and outputs a non-rigid motion vector component $\Delta v_h(x, y, t)$ of the motion vector difference.

The filtering unit convolves a Gaussian filter with the difference $\Delta v(x, y, t)$ to obtain a low spatial frequency component $\Delta v_l(x, y, t)$ of the difference $\Delta v(x, y, t)$. For example, the standard deviation of the Gaussian filter kernel is 8 pixels. The standard deviation is not limited to this and any value can be set. However, if the standard deviation is too small, almost no non-rigid components remain to be extracted in the neat step, and if it is too large, non-rigid components are likely to include a large amount of rigid motion components.

The filtering unit subtracts the low spatial frequency component $\Delta v_l(x, y, t)$ from the original difference $\Delta v(x, y, t)$ to obtain the non-rigid motion vector component $\Delta v_h(x, y, t)$ which is a high spatial frequency component. That is, $\Delta v_h(x, y, t)=\Delta v(x, y, t)-\Delta v_l(x, y, t)$.

Second Parameter Generation Unit 160

The second parameter generation unit 160 takes the reduced motion vector $v_s(x, y, t)$, the non-rigid motion vector component $\Delta v_h(x, y, t)$, the region-divided minimum luminance image $I_{Min}^i(x, y)$, the region-divided maximum luminance image $I_{Max}^i(x, y)$, the region-divided intermediate luminance image $I_0^i(x, y)$, the ratio ρ, the P2C map, and the C2P map as inputs. The second parameter generation unit 160 uses the reduced motion vector $v_s(x, y, t)$ scaled by the first parameter output from the motion vector reduction unit 140 and the non-rigid motion vector component $\Delta v_h(x, y, t)$ output from the non-rigid vector extraction unit 150 to generate a second parameter $\lambda_2$ (S160) and outputs the generated second parameter $\lambda_2$. The second parameter $\lambda_2(x, y, t)$ is a parameter for scaling the non-rigid motion vector component $\Delta v_h(x, y, t)$ as in "$v_s(x, y, t)+\lambda_2(x, y, t)\Delta v_h(x, y, t)$" when a motion lost due to reduction with the first parameter is compensated for with the non-rigid motion vector component.

Figure 8:
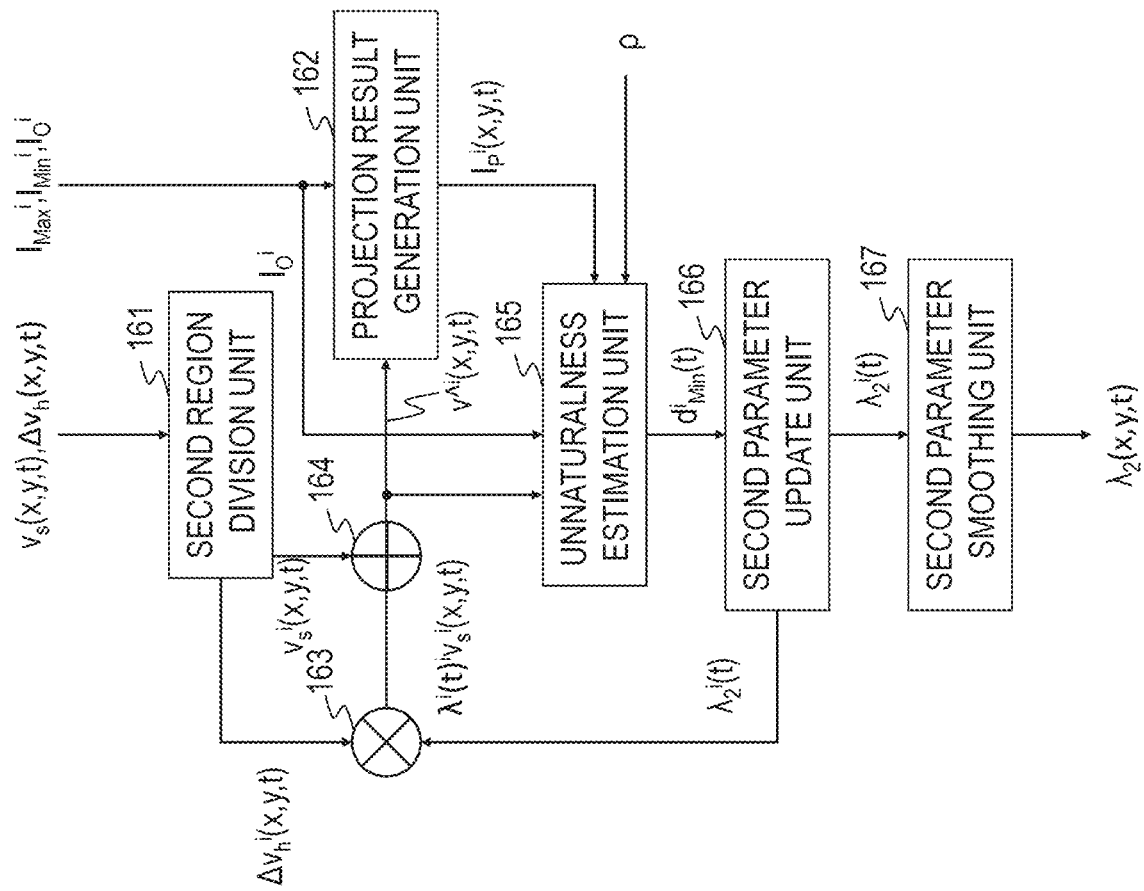
FIG. 8 is a functional block diagram of a second parameter generation unit according to the first embodiment.
Figure 9:
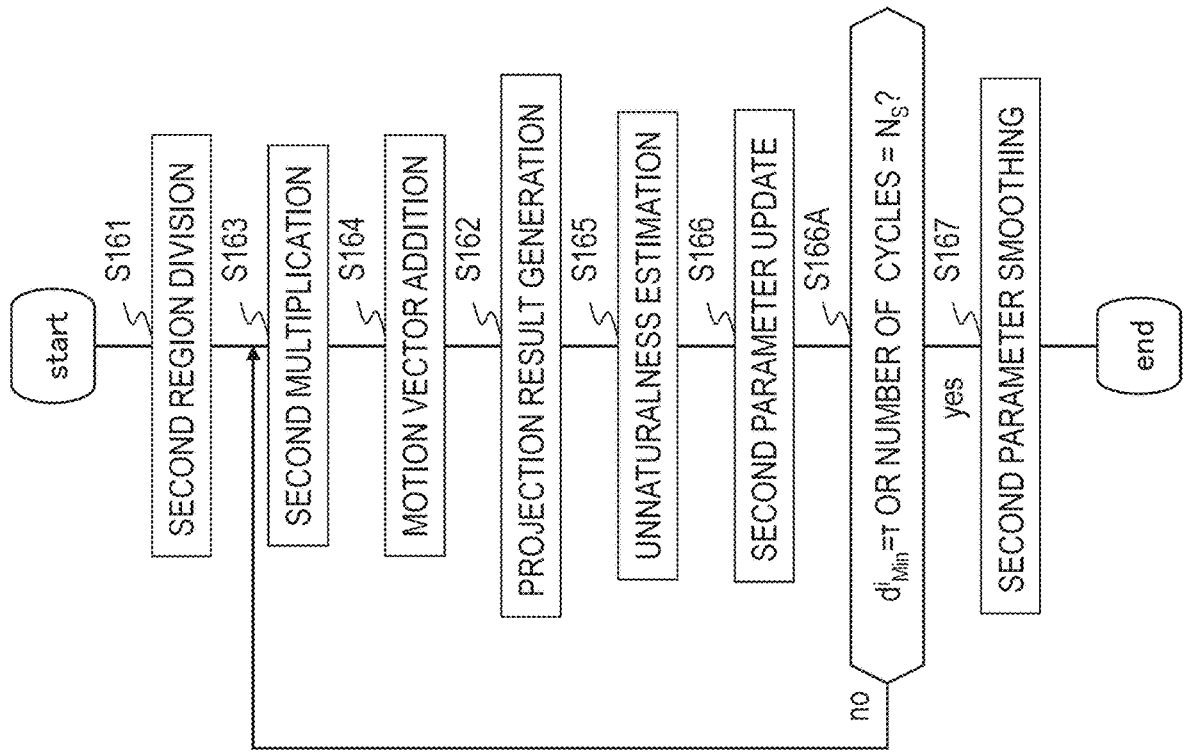
FIG. 9 is a diagram illustrating an example of a processing flow of the second parameter generation unit according to the first embodiment.
Figure 10:
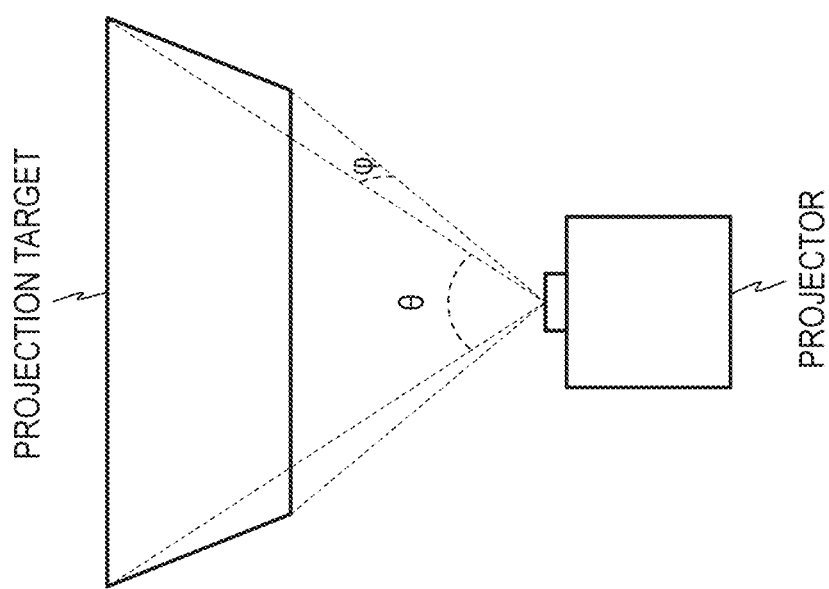
FIG. 10 is a diagram for explaining a projection method of a projector.

FIG. 8 is a functional block diagram of the second parameter generation unit 160 and FIG. 9 illustrates an example of a processing flow thereof.

As illustrated in FIG. 8, the second parameter generation unit 160 includes a second region division unit 161, a projection result generation unit 162, a second multiplication unit 163, a motion vector addition unit 164, an unnaturalness estimation unit 165, a second parameter update unit 166, and a second parameter smoothing unit 167. Details of the processing of each part will be described below.

Second Region Division Unit 161

The second region division unit 161 takes the reduced motion vector $v_s(x, y, t)$ scaled by the first parameter and the non-rigid motion vector component $\Delta v_h(x, y, t)$ output from the non-rigid vector extraction unit 150 as inputs and obtains and outputs a region-divided reduced motion vector $v_s^i(x, y, t)$ and a region-divided non-rigid motion vector component $\Delta v_h^i(x, y, t)$. Here, i represents the region number.

Similar to the region division unit 131 of the first parameter generation unit 130, the second region division unit 161 divides the input vectors (the reduced motion vector $v_s(x, y, t)$ and the non-rigid motion vector component $\Delta v_h(x, y, t)$) into regions (S161). A region-divided reduced motion vector $v_s^i(x, y, t)$ is output to the motion vector addition unit 164 and a region-divided non-rigid motion vector component $\Delta v_h^i(x, y, t)$ is output to the second multiplication unit 163.

The subsequent processing of the second parameter generation unit 160, except for the second parameter smoothing unit 167, is performed independently for each frame t of each region i. One second parameter $\lambda_2^i(t)$ is output for each flame t of each region i, and when second parameters $\lambda_2^i(t)$ are obtained for all regions/frames, they are collectively input to the second parameter smoothing unit 167.

Second Multiplication Unit 163

The second multiplication unit 163 takes the region-divided non-rigid motion vector component $\Delta v_h^i(x, y, t)$ and the current second parameter $\lambda_2^i(t)$ of the region i as inputs, multiplies the region-divided non-rigid motion vector component $\Delta v_h^i(x, y, t)$ by the current second parameter $\lambda_2^i(t)$ of the region i (S163), and outputs the product $(\lambda_2^i(t)\Delta v_h^i(x, y, t))$ to the motion vector addition unit 164. A value output from the second parameter update unit 166 is used as the current nt second parameter $\lambda_2^i(t)$.

Motion Vector Addition Unit 164

The motion vector addition unit 164 takes the region-divided reduced motion vector $v_s^i(x, y, t)$ and the non-rigid motion vector component $\lambda_2^i(t)\Delta v_h^i(x, y, t)$ multiplied by the current second parameter $\lambda_2^i(t)$ as inputs and obtains and outputs a vector $v^{\wedge i}(x, y, t)$ that combines the reduced motion vector and the non-rigid motion vector component.

The motion vector addition unit 164 combines the reduced motion vector $v_s^i(x, y, t)$ and the non-rigid motion vector component $\lambda_2^i(t)\Delta v_h^i(x, y, t)$ such that $v^{\wedge i}(x, y, t)=v_s^i(x, y, t)+\lambda_2^i(t)\Delta v_h^i(x, y, t)$ (S164) and outputs the combined vector $v^{\wedge i}(x, y, t)$ to the projection result generation unit 162 and the unnaturalness estimation unit 165.

Projection Result Generation Unit 162 and Unnaturalness Estimation Unit 165

The projection result generation unit 162 and the unnaturalness estimation unit 165 of the second parameter generation unit 160 perform the same processing S162 and S165 as that of the projection result generation unit 132 and the unnaturalness estimation unit 134 of the first parameter generation unit 130, respectively, except that the "motion vector $\lambda^i(t)v^i(x, y, t)$ scaled by the current first parameter" taken as an input motion vector is replaced with the "vector $v^{\wedge i}(x, y, t)$ that combines the reduced motion vector and the non-rigid motion vector component".

Second Parameter Update Unit 166

The second parameter update unit 166 takes an unnaturalness estimate $d^i{}_{Min}(t)$ obtained with a previous second parameter as an input and obtains and outputs a second parameter $\lambda_2^i(t)$ of the next cycle. However, in the first cycle, the second parameter update unit 166 performs only the output because there is no input.

The second parameter update unit 166 controls a process of searching for the second parameter. For example, the second primmer update unit 166 searches for a second parameter at which the unnaturalness estimate $d^i{}_{Min}(t)$ obtained by the unnaturalness estimation unit 165 is closest to app threshold τ. The value of τ is the same as that used in the first parameter update unit 135. A binary search method is used for the search, similar to the first parameter update unit 135.

The second parameter update unit 166 performs the same processing S166 and S166A as the first parameter update unit 135, except that the first parameter is replaced with the second parameter.

Second Parameter Smoothing Unit 167

The second parameter smoothing unit 167 performs the same processing S167 as the first parameter smoothing unit 136. The second parameter smoothing unit 167 takes the second parameter $\lambda_2^i(t)$ obtained from each region/frame as an input, smooths the input second parameter $\lambda_2^i(t)$ (S167), and outputs the smoothed second parameter $\lambda_2(x, y, t)$ of each pixel. However, the parameters $(s_s, s_t)$ that determine permissible levels for the magnitude of the gradient between adjacent regions are set greater than those of the first parameter smoothing unit 136 because non-rigid motion vector components do not significantly charge their qualitative impression of motion even if the magnitude of motion changes locally. In the present embodiment, $(s_s, s_t)=(0.3, 0.06)$. However, these parameters send limited to the values defined here and any value may be set as Icing as the spatial and temporal discontinuities of the magnitude of motion are not a concern.

The generated second parameter $\lambda_2(x, y, t)$ is output to the motion vector combining unit 170.

Motion Vector Combining Unit 170

The motion vector combining unit 170 takes the second parameter $\lambda_2(x, y, t)$, the non-rigid motion vector component $\Delta v_h(x, y, t)$, and the reduced motion vector $v_s(x, y, t)$ as inputs and obtains and outputs a combined motion vector $v^{\wedge}(x, y, t)$.

The motion vector combining unit 170 scales the non-rigid motion vector component $\Delta v_h(x, y, t)$ with the second parameter $\lambda_2(x, y, t)$ generated by the second parameter generation unit 160 and adds the scaled non-rigid motion vector component and the reduced motion vector $v_s(x, y, t)$ scaled by the first parameter to finally obtain a motion vector (a combined motion vector $v^{\wedge}(x, y, t)$) to be used for projection image generation (S170). That is, the motion vector combining unit 170 combines the motion vectors using the following equation.

[Math. 11]

$$\hat{v}(x,y,t)=v_s(x,y,t)+\lambda_2(x,y,t)\Delta v_h(x,y,t) \qquad (8)$$

The motion vector combining unit 170 outputs the combined motion vector $v^{\wedge}(x, y, t)$ to the projection image generation unit 180.

Projection Image Generation Unit 180

The projection image generation unit 180 takes the minimum luminance image $I_{Min}(x, y)$, the maximum luminance image $I_{Max}(x, y)$, the intermediate luminance image $I_0(x, y)$, the combined motion vector $v^{\wedge}(x, y, t)$, and the P2C map as inputs and obtains and outputs a projection image $I_P(x, y, t)$.

The projection image generation unit 180 distorts the intermediate luminance image $I_0(x, y)$ based on the combined motion vector $v^{\wedge}(x, y, t)$ to obtain a distorted image $I_W(x, y, t)$ (S180). The distortion method is similar to that of the projection result generation unit 132 in the first parameter generation unit 130.

The projection image generation unit 180 obtains an ideal projection image $I_M(x, y, t)$ for reproducing a distorted image using Equation (2), similar to the projection result generation unit 132 in the first parameter generation unit 130.

Further, the projection image generation unit 180 units the value of $I_M(x, y, t)$ to the physically projectable rangy [0, 1] of the projector.

The projection image generation unit 180 maps the image thus obtained to the projector coordinate system based on the P2C map, sets the resulting image as $I_P(x, y, t)$, and outputs it to the projection unit 190.

Projection Unit 190

The projection unit 190 takes the projection image $I_P(x, y, t)$ as an input and projects the input projection image from the projector toward the projection target (S190).

The projection image $I_P(x, y, t)$ is projected such that edges included in the projection image $I_P(x, y, t)$ overlap the contour of the projection target or edges included in the projection target. Here, alignment of the projection image $I_P(x, y, t)$ is unnecessary because the projection image $I_P(x, y, t)$ is generated based on the P2C map obtained through camera calibration. A commercially available projector may be used, but it is necessary to use a projector with high luminance when used in a bright room.

The projection unit 190 projects the projection image $I_P(x, y, t)$ onto the projection target $M_{static}$ using a known optical production technique (see for example, Reference 4) to display a moving image M2.

$$M_2 = M_{static} \bigcirc I_P(x,y,t) \quad [\text{Math. 12}]$$

(Reference 4) Takahiro Kawabe, Masataka Sawayama, Kazushi Maruya, and Shinya Nishida, (2014). "A light projection method to perceptually deform two-dimensional static objects by motion information", Annual conference of the Institute of Image Information and Television Engineers 2014, 5-3.

Here, $\bigcirc$ represents a state in which the projection image $I_P(x, y, t)$ is added to/multiplied by (applied to) the luminance component of the projection target $M_{static}$ in a combined manner. In other words, $\bigcirc$ represents a state in which an operation including at least one of addition and multiplication is performed on the luminance component of the projection target $M_{static}$ and the projection image $I_P(x, y, t)$. That is, when light is projected alto a printed matter, it is assumed that the reflection pattern differs depending on the characteristics of paper or ink and the luminance changes multiplicatively in some parts while changing additively in other parts. Thus, c indicates a calculation that makes the luminance change in those two ways.

Effects

With the above configuration, motion information to be projected can be automatically adjusted and optimized for each region and each frame according to the projection target and the projection environment. Further, fine adjustments that are difficult to perform manually can be performed in a short time.

Modifications

In the present embodiment, the projection target photographing unit 110, the camera-projector pixel correspondence acquisition unit 120, and the addition unit 125 may be provided as separate devices and a projection image generation apparatus including the remaining components may take their output values ($I_{Max}$, $I_{Min}$, $I_0$, $\rho$, the P2C map, and the C2P map) as inputs. Further, the projection unit 190 may be provided as a separate device and the projection image generation apparatus may be configured to output the projection image $I_P(x, y, t)$ to the projection unit 190 which is a separate device.

Furthermore, the first der generation unit 130, the motion vector reduction unit 140, the non-rigid vector extraction unit 150, the second parameter generation unit 160, and the motion vector combining unit 170 may be extracted from the projection image generation apparatus of the present embodiment and implemented to function as a motion vector generation apparatus. In this case the motion vector generation apparatus takes, $I_{Max}$, $I_{Min}$, $I_0$, $\rho$, the P2C map, the C2P map, and v(x, y, t) as inputs and outputs a combined motion vector v^(x, y, t).

The same modifications can be made in the following embodiments.

Second Embodiment

When the magnitude of motion is manually adjusted as in Patent Literature 1, it is not possible to realize an application that interactively gives motions to a target (for example, an application that gives motions based on changes in the facial expression of a person to a photograph or painting through projection mapping while capturing the facial expression of the person in real time with a camera).

Processing of the first embodiment is performed such that the first parameter generation unit 130 and the second parameter generation unit 160 obtain first parameters $\lambda^i(t)$ (or second parameters $\lambda_2^i(t)$) of regions of each flame over all regions of all frames and then the first parameter smoothing unit 136 (or the second parameter smoothing unit 167) collectively smooths them at once to obtain first parameters $\lambda(x, y, t)$ (or second parameters $\lambda_2(x, y, t)$). Thus, similar to Patent Literature 1, the method of the first embodiment cannot be used in cases where it is required that input motion vectors v(x, y, t) be optimized sequentially (in real time) (for example, in applications that require interactivity).

A second embodiment will be described with regard to a method of performing processing for optimizing input motion vectors v(x, y, t) sequentially frame by flame. Hereinafter, changes from the first embodiment will be mainly described.

It is assumed that the input motion vector is a motion vector $v(x, y, t_0)$ at the current frame $t=t_0$ rather than v(x, y, t) for every frame. According to this, it is also assumed that the motion vector reduction unit 140, the non-rigid vector extraction unit 150, the neon vector combining unit 170, and the projection image generation unit 180 perform only processing relating to the current frame.

First Parameter Generation Unit 130

In the first parameter generation unit 130, the region division unit 131 performs region division of the motion vector $v(x, y, t_0)$ of the current flame in the same manner as in the first embodiment. The processing performed for each region (the processing of the multiplication unit 133, the projection result generation unit 132, the unnaturalness estimation unit 134, and the first parameter update unit 135) is performed in the same manner as in the first embodiment.

The processing of the first parameter smoothing unit 136 is replaced with the following processing.

First Parameter Smoothing Unit 136

The first parameter smoothing unit 136 takes the first pander $\lambda^i(t)$ obtained from each region/frame as an input and obtains and outputs a smoothed first parameter $\lambda(x, y, t_0)$ of each pixel.

The first parameter smoothing unit 136 in the second embodiment separately performs smoothing in the spatial direction and smoothing in the temporal direction. The smoothing in the spatial direction is performed through the same procedure as in the first embodiment as follows.

The first parameter of each region will be referred to as $\lambda(m, n)$ for the sake of explanation. Here, m represents the horizontal position of the region and n represents the vertical position of the region. First, smoothing is performed such that extreme value changes do not occur between adjacent first parameters $\lambda(m, n)$. At this time, smoothing is performed by replacing $\lambda(m, n)$ with $\lambda'(m, n)$ such that the following two constraints are satisfied.

Constraint 1: $\lambda'(m, n) \leq \lambda(m, n)$ nest be satisfied for all m and n. This can restrict the unnaturalness from exceeding an unnaturalness threshold due to the smoothing process.

Constraint 2: The following must be satisfied for all m and n.

$$|\lambda'(m,n)-\lambda'(m',n')| \leq \sqrt{(|m-m'|^2+|n-n'|^2)}s_s \quad \text{[Math. 13]}$$

Here, (m', n') represents a set of regions around (m, n), where $m' \in \{m-1, m, m+1\}$, $n' \in \{n-1, n, n+1\}$. In addition, $s_s$ is a permissible value for the magnitude of the gradient between adjacent regions. As in the first embodiment, $s_s=0.06$. The method described in Reference 3 can be used as an algorithm for updating $\lambda(m, n, t)$, similar to the first embodiment. The specific processing is as illustrated in FIG. 11.

Smoothing is performed in the temporal direction after smoothing in the spatial direction. For this purpose a first parameter $\lambda''(m, n, t_0-1)$ of an immediately previous frame that has been smoothed in the spatial and temporal directions thereinafter referred to as $\lambda''(t_0-1)$ for the sake of simplicity) is read from the storage unit, and a first parameter $\lambda'(m, n, t_0)$ of the current frame that has been smoothed in the spatial direction (hereinafter referred to as $\lambda'(t_0)$ for the sake of simplicity) is smoothed in the following manner to obtain a first parameter $\lambda''(m, n, t_0)$ that has been smoothed in the temporal direction referred to as $\lambda''(t_0)$ for the sake of simplicity).

[Math. 14]

$$\lambda''(t_0) = \begin{cases} \lambda''(t_0-1) + s'_t/F & \text{if } \lambda'(t_0) - \lambda''(t_0-1) > s'_t/F \\ \lambda''(t_0-1) - s'_t/F & \text{if } \lambda'(t_0) - \lambda''(t_0-1) < -s'_t/F \\ \lambda'(t_0) & \text{otherwise} \end{cases} \quad (9)$$

Here, F represents the overall frame rate of the system and $s'_t$ is a parameter that determines the permissible value (maximum value) of the magnitude of the gradient from the previous frame. In the present embodiment, $s'_t=2$, assuring a frame rate of F=60. In this case, the permissible magnitude of the gradient in the temporal direction of the first parameter is 0.033. The permissible magnitude of the gradient does not necessarily have to be this value, but the discontinuity of the magnitude of motion may be noticeable if it is too large, while the number of frames in which the unnaturalness of the projection result becomes greater than the threshold t increases if it is too small. In consideration of these factors, the user may be allowed to select an optimum parameter. If there is no previous frame, the subsequent processing is performed with $\lambda''(t_0)=\lambda'(t_0)$. The obtained first parameter $\lambda''(t_0)$ that has been smoothed is stored in the storage omit and used for the smoothing process of the next frame.

That is, based on the magnitude relationship between the predetermined value ($s'_t/F$ or $-s'_t/F$) and the difference between the "first parameter $\lambda''(t_0-1)$ of the immediately previous frame that has been smoothed in the spatial and temporal directions" and the "first parameter $\lambda'(t_0)$ of the current flame that has been smoothed in the spatial direction", the first parameter smoothing unit 136 smooths the first parameter $\lambda'(t_0)$ in the temporal direction using the first parameter $\lambda''(t_0-1)$ and the predetermined value ($s'_t/F$ or $-s'_t/F$).

Finally, $\lambda''(t_0)$ is expanded through the bilinear interpolation method or the like as in the first embodiment to obtain the first parameter $\lambda(x, y, t_0)$ of each pixel.

Second Parameter Generation Unit 160

In the second parameter generation unit 160, the second region division unit 161 performs region division of the reduced motion vector $v_s(x, y, t_0)$ of the current frame and the non-rigid motion vector component $\Delta v_h(, y, t_0)$ of the cuent frame in the same manner as in the first embodiment. The processing performed for each region (the processing of the second multiplication unit 163, the motion vector addition unit 164, the projection result generation unit 162, the unnaturalness estimation unit 165, and the second parameter update unit 166) is performed in the same manner as in the first embodiment.

Second Parameter Smoothing Unit 167

The processing of the second parameter smoothing unit 167 is replaced with the same processing as that of the first parameter smoothing unit 136 in the second embodiment.

That is, the second parameter smoothing unit 167 first performs smoothing in the spatial direction using the method described in Reference 3 and then performs smoothing in the temporal direction. The parameter that determines the permissible level of the magnitude of the gradient in the spatial direction when smoothing is performed in the spatial direction is set such that $s_s=0.3$ as with the second parameter smoothing unit 167 in the first embodiment. Based on the magnitude relationship between the predetermined value ($s't/F$ or $-s't/F$) and the difference between the "second parameter $\lambda''_2(t_0-1)$ of the immediately precious frame that has been smoothed in the spatial and temporal directions" and the "second parameter $\lambda'_2(t_0)$ of the current frame that has been smoothed in the spatial direction", the second parameter $\lambda'_2(t_0)$ is smoothed in the temporal direction using the second parameter $\lambda''_2(t_0-1)$ and the predetermined value ($s'_t/F$ or $-s'_t/F$), similar to the first parameter smoothing unit 136 in the second embodiment. However, the parameter $s'_t$ that determines the permissible level of the magnitude of the gradient is set greater than that of the first parameter smoothing unit. In the pent embodiment, $s'_t=4$. However, the value of $s'_t$ is not limited to the value defined here and any value may be set as long as the temporal discontinuity of the magnitude of motion is not a concern.

Effects

With the above configuration, the same advantageous effects as those of the first embodiment can be achieved. Further, the motion vector $v(x, y, t)$ can be optimized sequentially (in real time). The present invention can be applied to an application that interactively gives motions to a target.

Third Embodiment

Parts different from the first and second embodiments will be mainly described.

Here, a plurality of bandpass components may be extracted using a plurality of bandpass filters, whereas in the first and second embodiments, the filtering unit of the non-rigid vector extraction unit 150 extracts a high-frequency component of the motion vector as a non-rigid motion vector component $\Delta v_h(x, y, t)$.

For example, a non-rigid vector extraction unit 150 may be configured to decompose a motion vector into a plurality of ($N_P$) bandpass components $\Delta v_{b\_1}, \Delta v_{b\_2}, \ldots, \Delta v_{b\_N\_P}$ (where $N_P$ is an integer of 2 or more) using a Laplacian pyramid or the like and to obtain nth parameters of different spatial frequency components ($n \in 2, \ldots, N_{P+1}$).

Figure 12:
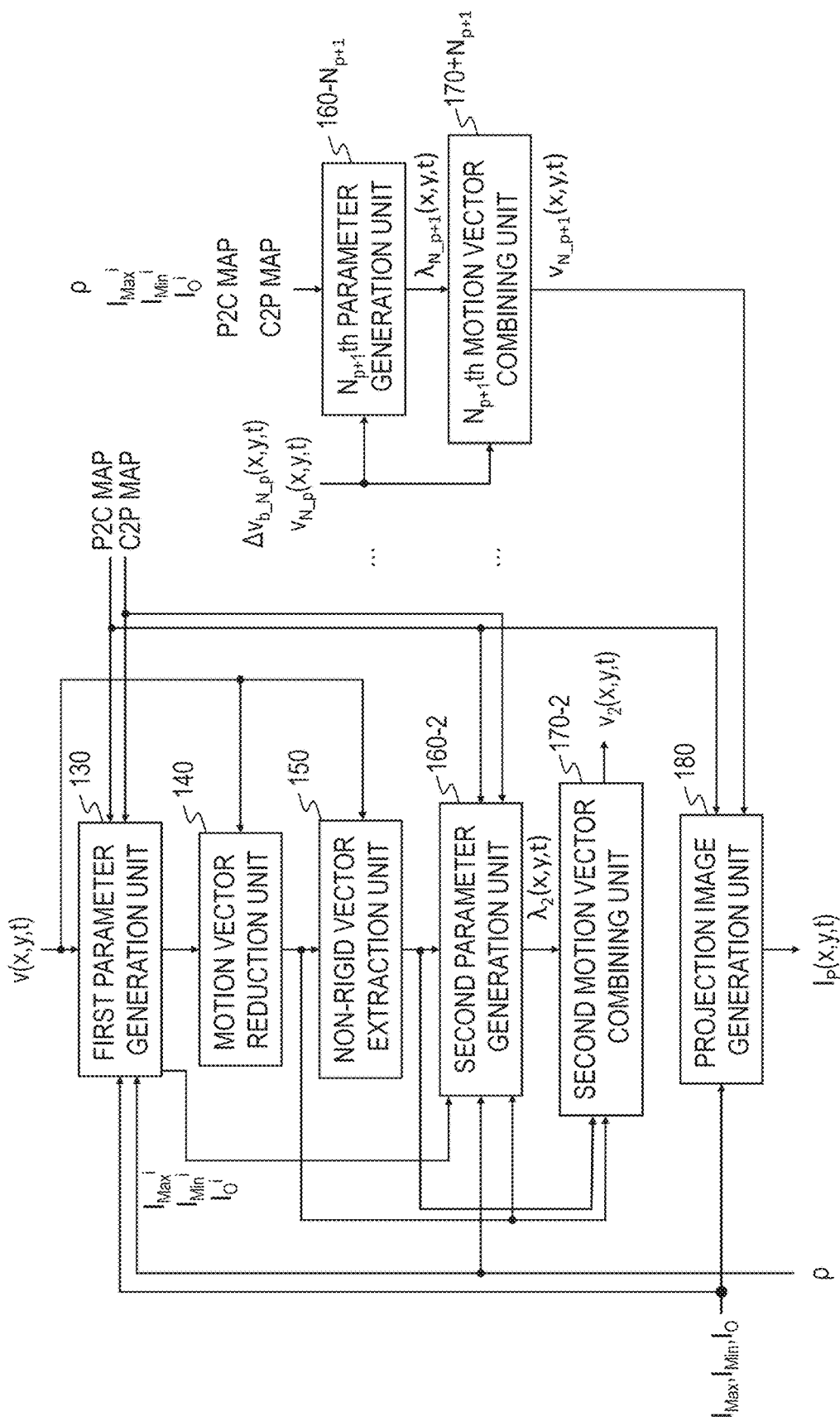
FIG. 12 is a functional block diagram of a projection image generation apparatus according to a third embodiment.
Figure 13:
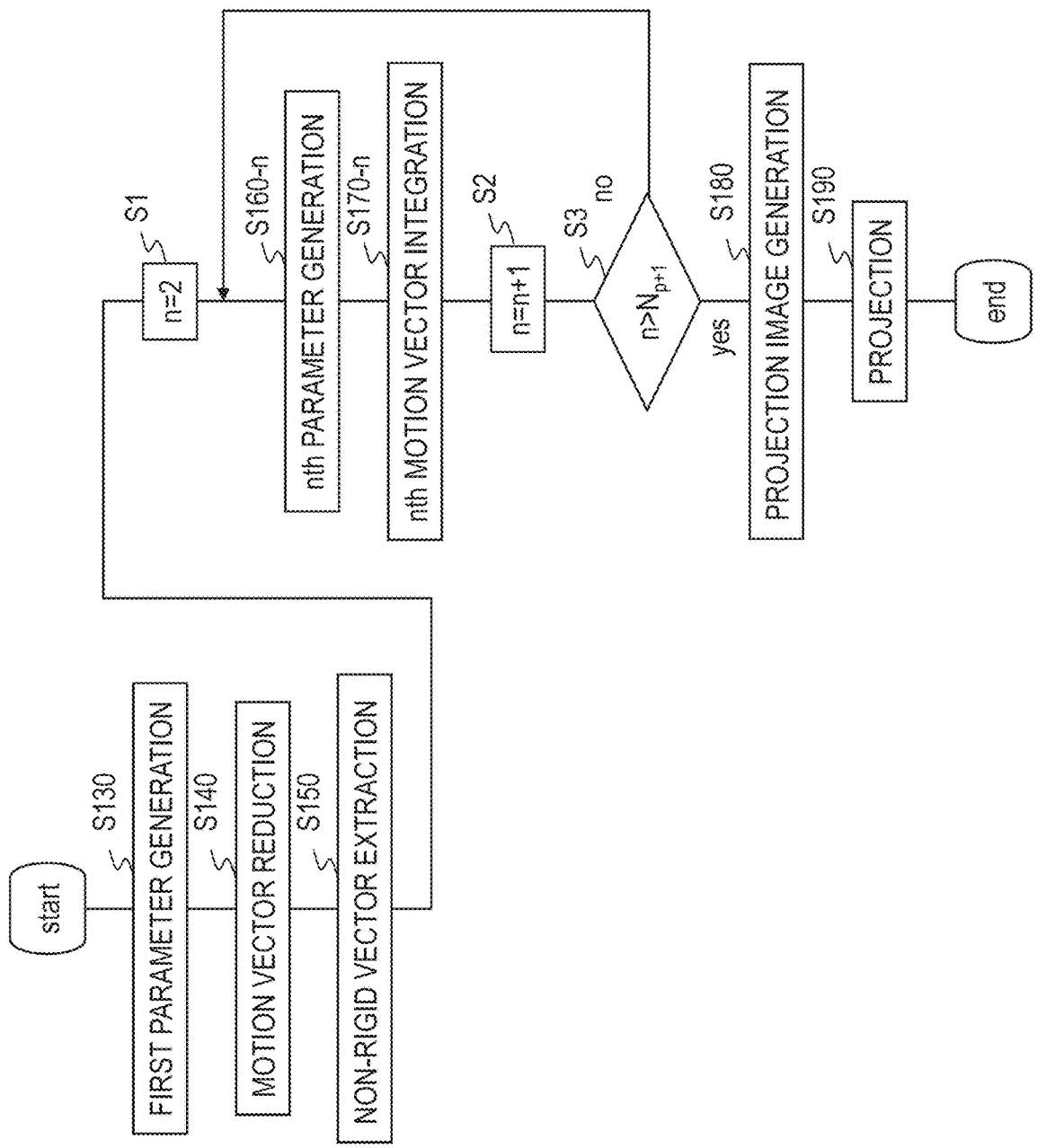
FIG. 13 is a diagram illustrating an example of a processing flow of the projection image generation apparatus according to the third embodiment.

FIG. 12 is a functional block diagram of a projection image generation apparatus according to the third embodiment and FIG. 13 illustrates an example of a processing flow thereof. FIG. 12 omits illustration of a projection target photographing unit 110, an addition unit 125, a camera-projector pixel correspondence acquisition unit 120, and a projection unit 190.

The projection image generation apparatus according to the third embodiment includes $N_P$ pieces of nth parameter generation units 160-$n$ and $N_P$ pieces of nth motion vector combining units 170-$n$ ($n \in 2, \ldots, N_{P+1}$) instead of the second parameter generation unit 160 and the motion vector combining unit 170 of the projection image generation apparatus of the first embodiment or the second embodiment.

nth Parameter Generation Unit 160-$n$

Each nth parameter generation unit 160-$n$ perform the same processing as that of the second parameter generation unit 160 of the first embodiment (or the second embodiment) except for points described below.

The nth parameter generation unit 160-$n$ takes a combined motion vector $v_{n-1}(x, y, t)$ output from an (n-1)th motion vector combining unit 170-($n-1$) (a reduced motion vector $v_s(x, y, t)$ if n=2), an (n-1)th bandpass component $\Delta v_{b\_n-1}(x, y, t)$ of the motion vector, a region-divided minimum luminance image $I_{Min}{}^i(x, y)$, a region-divided maximum luminance image $I_{Max}{}^i(x, y)$, a region-divided intermediate luminance image $I_0{}^i(x, y)$, a ratio $\rho$, a P2C map, and a C2P man as inputs, obtains an nth parameter $\lambda_n$ using these inputs (S160-$n$), and outputs the obtained nth parameter $\lambda_n$. The nth parameter $\lambda_n(x, y, t)$ is a parameter for scaling the (n-1)th bandpass component $\Delta v_{b\_n-1}(x, y, t)$ as in "$v_s(x, y, t) + \lambda_2(x, y, t)\Delta v_1(x, y, t) + \ldots + \lambda_n(x, y, t)\Delta v_{b\_n-1}(x, y, t) + \ldots + \lambda_{N\_P+1}(x, y, t)\Delta v_{b\_N\_P}(x, y, t)$" when a motion lost due to reduction with the first parameter is compensated for with the (n-1)th bandpass component $\Delta v_{b\_n-1}(x, y, t)$.

That is, the nth parameter generation unit 160-$n$ replaces the non rigid motion vector component $\Delta v_h(x, y, t)$ with the (n-1)th bandpass component $\Delta v_{b\_n-1}(x, y, t)$ of the motion vector.

Only when n>2, the reduced motion vector $v_s(x, y, t)$ is replaced with the combined motion vector $v_{n-1}(x, y, t)$ output from the (n-1)th motion vector combining unit 170-($n-1$) and the second parameter $\lambda_2$ is replaced with the nth parameter $\lambda_n$.

The constraints in the magnitude of the gradient $s_s$ and $s_t$ ($s'_t$ when real-time processing is performed as in the second embodiment) used in a second parameter smoothing unit 167 in the nth parameter generation unit 160-$n$ gradually increases with n (for example, increases by 2 times each time n increases by 1).

The obtained nth parameter $\lambda_n(x, y, t)$ is output to the nth motion vector combining unit 170-$n$.

nth Motion Vector Combining Unit 170

The nth motion vector combining unit 170 takes the nth parameter $\lambda_n(x, y, t)$, the (n-1)th bandpass component $\Delta v_{b\_n-1}(x, y, t)$ of the motion vector, and the combined motion vector $v_{n-1}(x, y, t)$ output from the (n-1)th motion vector combining unit 170-($n-1$) as inputs and obtains and outputs a combined motion vector $v_n(x, y, t)$.

The nth motion vector combining unit 170 adds the (n-1)th bandpass component $\lambda_n(x, y, t)\Delta v_{b\_n-1}(x, y, t)$ scaled using the nth parameter and the (n-1) combined vector $v_{n-1}(x, y, t)$ according to the following equation to calculate the combined motion vector $v_n(x, y, t)$ (S170-$n$).

$$v_n(x,y,t) = v_{n-1}(x,y,t) + \lambda_n(x,y,t)\Delta v_{b_{n-1}}(x,y,t) \qquad \text{[Math. 15]}$$

When n<$N_P$+1, the combined motion vector $v_n(x, y, t)$ is output to the (n+1)th parameter generation unit 160-($n+1$) and the (n+1)th motion vector combining unit 170-($n+1$).

When n=$N_P$+1, the combined motion vector $v_{N\_P+1}(y, t)$ is output to the projection image generation unit 180 as $\hat{v}(x, y, t)$.

The above processes S160-$n$ and S170-$n$ are repeated from n=2 to n=$N_{P+1}$ (S1, S2, S3).

Effects

With the above configuration, the same advantageous effects as those of the first or second embodiment can be achieved. Further, finer adjustment can be performed by compensating for a motion lost due to reduction with the first parameter for each bandpass component.

Fourth Embodiment

Parts different from the first and second embodiments will be mainly described.

If it is known in advance that a motion vector $v(x, y, t)$ to be input does not include many rigid motions, the non-rigid vector extraction unit 150, the second parameter generation unit 160, and the motion vector combining unit 170 may be omitted and a motion vector obtained by the motion vector reduction unit 140 may be used as a final motion vector in the projection image generation unit 180. In this case, the parameters used in the first parameter smoothing unit ($s_s$ and $s_t$ in the first embodiment and $s_s$ and $s'_t$ in the second embodiment) are replaced with those used in the second parameter smoothing unit 167.

Figure 14:
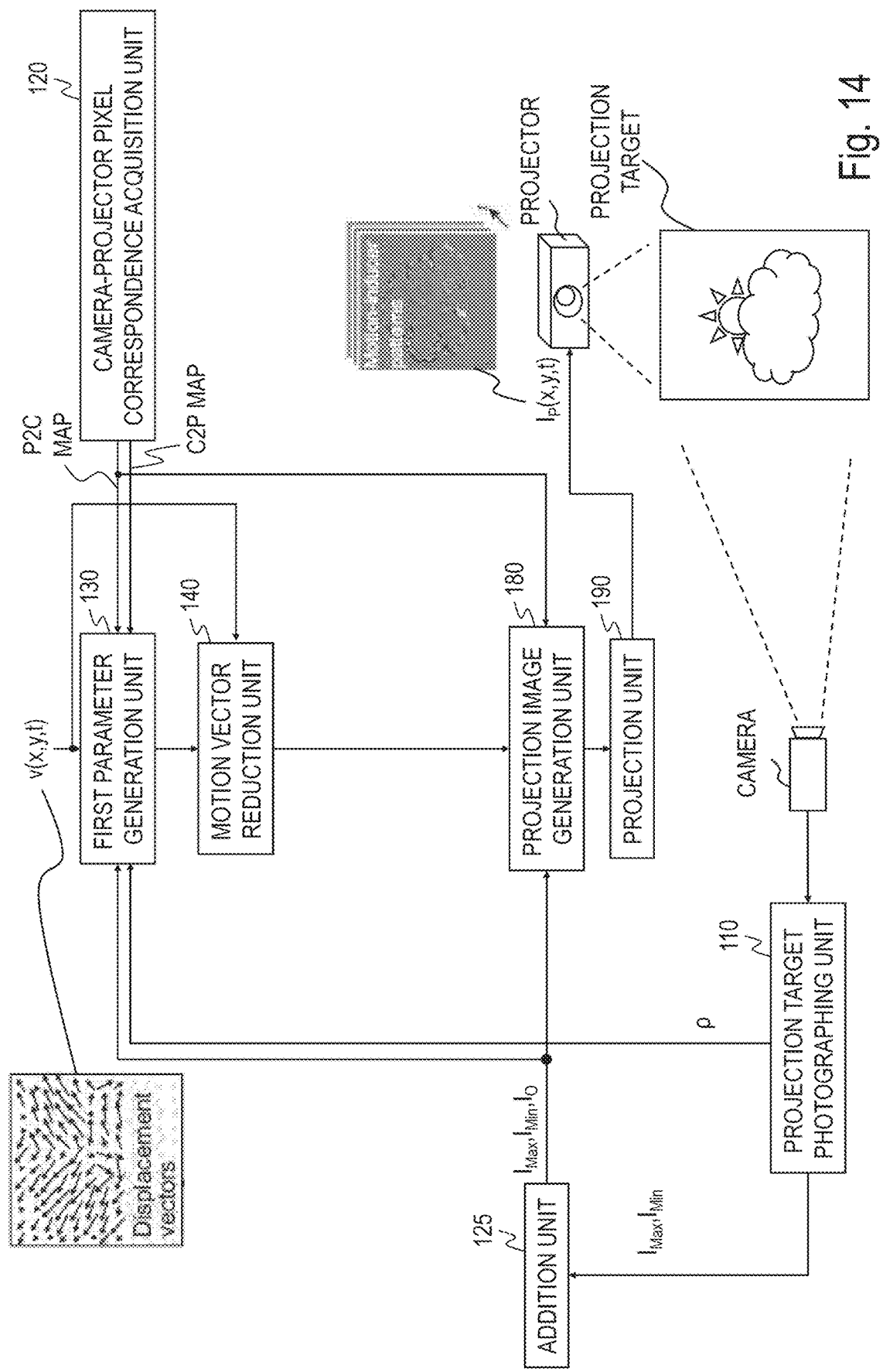
FIG. 14 is a functional block diagram of a projection image generation apparatus according to a fourth embodiment.
Figure 15:
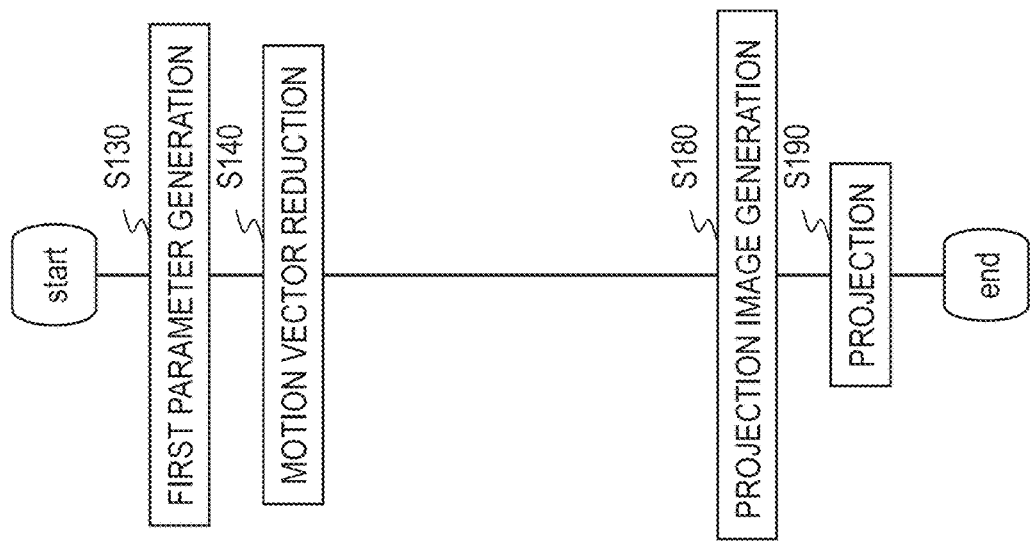
FIG. 15 is a diagram illustrating an example of a processing flow of the projection image generation apparatus according to the fourth embodiment.

FIG. 14 is a functional block diagram of the projection image generation apparatus according to the fourth embodiment and FIG. 15 illustrates a processing flow thereof.

Fifth Embodiment

Parts different from the first embodiment will be mainly described.

In the unnaturalness estimation unit 134 described in the first embodiment, it is necessary to run a loop to simultaneously obtain the third parameter $\alpha^i$ that determines a perceptual magnitude of motion with respect to a projection result and the unnaturalness estimate $d^i{}_{Min}(t)$ and thus the processing takes time. The present embodiment will be described with regard to a method in which a third parameter $\alpha^i$ is first analytically obtained and an unnaturalness estimate $d^i{}_{Min}(t)$ is calculated using the obtained third parameter $\alpha^i$, thereby allowing $d^i{}_{Min}(t)$ to be output without ruining the loop. In the present embodiment, only the unnaturalness estimation unit 134 is replaced with an unnaturalness estimation unit 534 of FIG. 16, while any types can be used for other processes and components.

Figure 16:
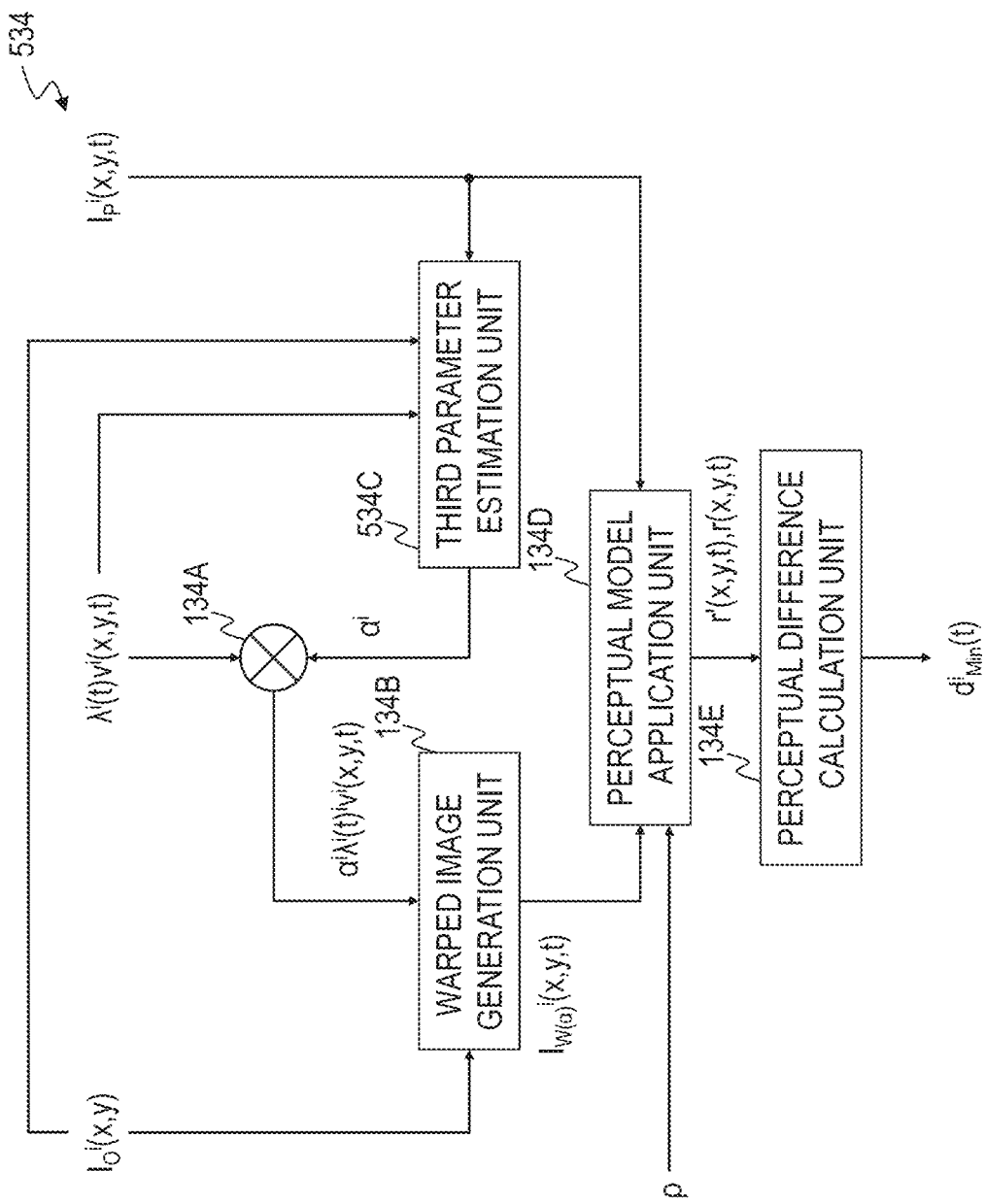
FIG. 16 is a functional block diagram of an unnaturalness estimation unit according to a fifth embodiment.
Figure 17:
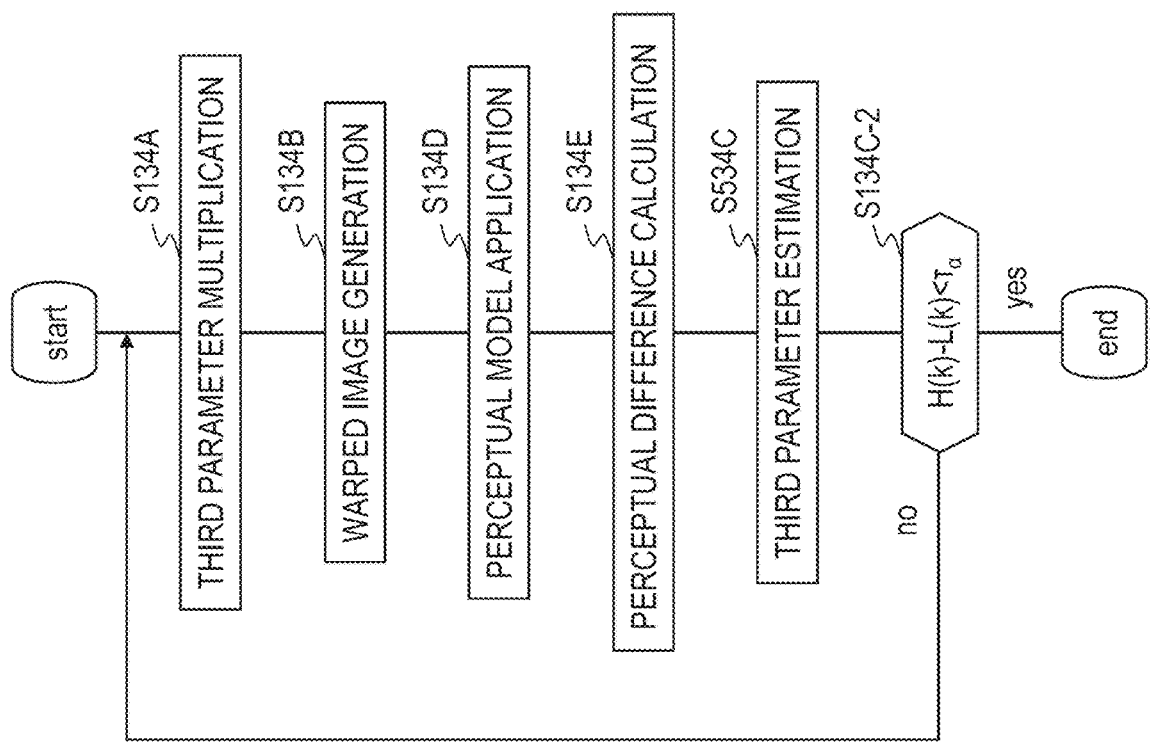
FIG. 17 is a diagram illustrating an example of a processing flow of the unnaturalness estimation unit according to the fifth embodiment.

FIG. 16 is a functional block diagram of the unnaturalness estimation unit 534 according to the fifth embodiment and FIG. 17 illustrates an example of a processing flow thereof.

Compared with the unnaturalness estimation unit 134 of the first embodiment (see FIGS. 5 and 6), the third parameter update unit 134C is removed, and instead, a third parameter estimation unit 534C is newly added. The other can on processing units (a third parameter multiplication unit 134A, a warped image generation unit 134B, a perceptual model application writ 134D, and a perceptual difference calcination twit 134E) perform the sane processing as those of the unnaturalness estimation writ 134 of the first embodiment, except for the following two points.

(1) A third parameter $\alpha^i$, which is input to the third parameter multiplication unit 134A, is provided by the third parameter estimation alit 534C.

(2) A perceptual difference $d^i(t)$ obtained by the perceptual difference calculation unit 134E is directly output from the unnaturalness estimation unit 534C as an unnaturalness estimate $d_{Min}^i(t)$.

Hereinafter, the processing of the third parameter estimation unit 534C will be specifically described.

Third Parameter Estimation Unit 534C

The third parameter estimation unit 534C takes an intermediate luminance image $I_0^i(x, y)$, a motion vector $\lambda^i(t)v^i(x, y, t)$ scaled by the first parameter, and a projection result reproduction image $I_P^i(x, y, t)$ as inputs, obtains a third parameter $\alpha^i$ (S534C), and outputs the third parameter $\alpha^i$.

By expressing the process of distorting the intermediate luminance image $I_0^i(x, y)$ based on the motion vector $\lambda^i(t)v^i(x, y, t)$ scaled by the first parameter $\lambda^i(t)$ as a linear equation by a first-order approximation of Taylor expansion, the third parameter estimation unit 534C uniquely obtains the third parameter $\alpha^i$ without repeatedly obtaining the perceptual difference $d^i(t)$.

The third parameter $\alpha^i$ is a parameter that determines the "perceptual amount of motion $\alpha^i\lambda^i(t)v^i(x, y, t)$" perceived when the projection result reproduction image $I_P^i(x, y, t)$ is Viewed $\alpha^i$ which minimizes the perceptual difference $d^i(t)$ between the projection result reproduction image $I_P^i(x, y, t)$ and the image $I_{W(\alpha)}^i(x, y, t)$ generated by distorting the original intermediate luminance image $I_0^i(x, y)$ by $\alpha^i\lambda^i(t)v^i(x, y, t)$ on the computer is obtained as "$\alpha^i$ that determines the perceptual amount of motion". At this time, the first embodiment converts the projection result reproduction image $I_P^i(x, y, t)$ and the image $I_{W(\alpha)}^i(x, y, t)$ into perceptual responses $r(x, y, t)$ and $r'(x, y, t)$, respectively, and then explicitly calculates the distance $d^i(t)$ between the perceptual responses $r(x, y, t)$ and $r'(x, y, t)$ as a perceptual difference and obtains $\alpha^i$ that minimizes $d^i(t)$ through a search including iterative processing. Here, a method of directly estimating $\alpha^i$ without calculating $d^i(t)$ will be described. Hereinafter, the superscript i (which indicates belonging to the region i) and the time frame t will be omitted to simplify the description. (Processing is performed independently for each region i and each frame t)

First, the case of obtaining $\alpha$ that minimizes a physical difference (an average squared error between images) rather than the perceptual difference will be considered to simplify the problem. This can be described as a problem of calculating $\alpha$ that minimizes the following error function.

[Math. 16]

$$e=\Sigma_{x,y}(I_P(x,y)-I_{W(\alpha)}(x,y))^2 \quad (10)$$

Here $I_{W(\alpha)}(x, y)$ is expressed as follows.

[Math. 17]

$$I_{W(\alpha)}(x,y)=I_O(x-\alpha v_x(x,y),y-\alpha v_y(x,y)) \quad (11)$$

Here, $v_x(x, y)$ and $v_y(x, y)$ represent x- and y-axis elements of the motion vector $\lambda_v(x, y)$, respectively. To simplify the description, pixel movement will be described as inverse warping (a mode in which the original image is referred to by the image after movement). However, in the present embodiment, the approximation described below also holds for forward warping (a mode in which the image after movement is referred to by the origins image) because it is assumed that $\alpha$ is spatially smooth.

Equation (11) can be expressed as follows by a first-order approximation of Taylor expansion.

[Math. 18]

$$I_{W(\alpha)}(x, y) \approx I_O(x, y) - \alpha\left(\frac{\partial I_O}{\partial x}v_x(x, y) + \frac{\partial I_O}{\partial y}v_y(x, y)\right) \quad (12)$$

$\alpha=1$ is substituted into Equation (12) to obtain the following equation

[Math. 19]

$$I_{W(1)}(x, y) \approx I_O(x, y) - \left(\frac{\partial I_O}{\partial x}v_x(x, y) + \frac{\partial I_O}{\partial y}v_y(x, y)\right) \quad (13)$$

The following equation is obtained from Equations (12) and (13).

[Math. 20]

$$I_{W(\alpha)}(x,y) \approx I_O(x,y)+\alpha(I_{W(1)}(x,y)-I_O(x,y)) \quad (14)$$

Here, by setting $D_P=I_P-I_0$ and $D_W=I_{W(1)}-I_0$ and substituting Equation (14) into Equation (10), the following equation is obtained.

[Math. 21]

$$e=\Sigma_{x,y}(D_P(x,y)-\alpha D_W(x,y))^2 \quad (15)$$

The solution of this minimization problem of e can be uniquely obtained using the following equation.

[Math. 22]

$$\alpha = \frac{\Sigma_{x,y} D_P(x, y)D_W(x, y)}{\Sigma_{x,y}D_W(x, y)^2} \quad (16)$$

In the present embodiment, the first-order approximation of Taylor expansion is performed. However, this is an example and another approximation may be performed as long as it is a linear approximation using gradient information of an image.

Next, let us return to the problem of obtaining a which minimizes the perceptual difference rather than the physical difference. At this time, a method of solving Equation (16) by replacing $I_P$, $I_{W(1)}$, and $I_0$ with responses of the perceptual model which are conversion results through the same processing as that of the perceptual model application unit 134D can be considered first. However, instead of applying all the processing of the perceptual model application unit 134D to convert the image, conversion may be made into up to weighted bandpass images represented by Equation (4) and these may be substituted into Equation (16) to obtain $\alpha$. This may be adopted because it is possible to obtain sufficient accuracy to estimate the perceptual amount of motion without reproducing the contrast gain adjustment process represented by Equation (6). However, the conversion of Equation (6) is very important for the unnaturalness estimation. A specific procedure for obtaining the third parameter $\alpha^i$ is as follows.

The third parameter estimation unit 534C distorts the intermediate luminance image $I_0^i(x, y)$ based on the motion vector $\lambda^i(t)v^i(x, y, t)$ scaled by the first parameter $\lambda^i(t)$ to obtain $I^i{}_{W(1)}(x, y, t)$. The distortion method is similar to that of the projection result generation unit 132 in the first parameter generation unit 130.

Next, the third parameter estimation unit 534C converts each of $I^i{}_{W(1)}(x, y, t)$, $I^i{}_P(x, y, t)$, and $I_O(x, y)$ into weighted bandpass images $c_j(x, y)$ according to processing 1 to 3 of the perceptual model application unit 134D.

Further, the third parameter estimation unit 534C sums weighted bandpass images obtained from each of $I^i{}_{W(1)}(x, y, t)$, $I^i{}_P(x, y, t)$, and $I_O(x, y)$ over j such that $I_C(x, y) = \Sigma_j c_j(x, y)$ and combines the sums into three respective bandpass images $W_C(x, y)$, $P_C(x, y)$, and $O_C(x, y)$.

The thin parameter estimation unit 534C substitutes $D_P = P_C(x, y) - O_C(x, y)$ and $D_W = W_C(x, y) - O_C(x, y)$ into Equation (16) to obtain an estimate of the third parameter $\alpha^i$ (S534C). The estimate $\alpha^i$ of the third parameter is output to the third parameter multiplication unit 134A.

The other processes are the same as those of the unnaturalness estimation unit 134 of the first embodiment as described above.

Effects

With the above configuration, the same advantageous effects as those of the first embodiment can be achieved. Further, processing of the unnaturalness estimation unit can be speeded up. The present embodiment may be combined with the second to fourth embodiments.

Sixth Embodiment

In the first to fifth embodiments, the first parameter is kept lowered until the number of update cycles reaches $N_s$, unless the unnaturalness estimate $d^i{}_{Min}(t)$ is equal to or less than the threshold $\tau$. Thus, depending on the conditions, the first parameter becomes very small and the magnitude of motion may be reduced more than expected. In order to eliminate such a possibility and secure a minimum necessary impression of motion in the projection result after optimization, the first parameter may be constrained such that the first parameter does not fall below a certain lower limit. In a sixth embodiment which is an example of a method of constraining the first parameter, the unnaturalness estimation unit 134 also outputs a third parameter $\alpha^i$ (representing how much the perceptual magnitude of motion is compared with the physical magnitude of the vector) and the first parameter is constrained such that the first parameter multiplied by the thin parameter (=the "perceptual magnitude of motion obtained by the reduced motion vector" relative to the "magnitude of the original motion vector") does not fall below a predetermined threshold. This can be realized, for example, by replacing processing of the first parameter update unit 135 with the following processing First Parameter Update Unit 135

The first parameter update unit 135 takes an unnaturalness estimate $d^i{}_{Min}(t)$ obtained with a first parameter of the previous cycle and a third parameter $\alpha^i$ (which is indicated by ($\alpha^i$) in FIG. 3) as inputs, obtains a first parameter $\lambda^i(t)$ of the next cycle (S135), and outputs the obtained first parameter $\lambda^i(t)$. However, in the first cycle, the first parameter update unit 135 performs only the output because there is no input.

In the first cycle, the first parameter update unit 135 stores $\lambda^i(t)=0.5$ and a step size of stp=0.25 in the storage unit and outputs $\lambda^i(t)$ to the multiplication unit 133.

In the subsequent cycles, the first parameter update unit 135 updates $\lambda^i(t)$ as follows based on a result of comparison between the input unnaturalness estimate $d^i{}_{Min}(t)$ and the threshold $\tau$.

When $d^i{}_{Min}(t)<\tau$, the first parameter update unit 135 updates the first parameter such that $\lambda^i(t)=\lambda^i(t)+$stp (overwrites the first parameter such that $\lambda^i(t)=1$ if $\lambda^i(t)$ exceeds 1 in this process) and stores the updated first parameter in the storage unit.

When $d^i{}_{Min}(t)>\tau$, the first parameter update unit 135 updates the first parameter such that $\lambda^i(t)=\lambda^i(t)-$stp (overwrites the first parameter such that $\lambda^i(t)=\tau_2/\alpha^i$ if $\alpha^i\lambda^i(t)<\tau_2$ in this process) and stores the updated first parameter in the storage unit.

When $d^i{}_{Min}(t)=\tau$ or the number of cycles is $N_S$, the first parameter update unit 135 ends the search and outputs $\lambda^i(t)$ to the first parameter smoothing unit 136. In other cases, the first parameter update unit 135 updates the step size such that stp=stp/2 and stores it in the storage unit and outputs $\lambda^i(t)$ to the multiplication unit 133.

Effects

With the above configuration, the same advantageous effects as those of the first embodiment can be achieved. Further, a minimum necessary impression of motion can be secured. The present embodiment may be combined with the second to fifth embodiments.

Seventh Embodiment

The projection image generation method may be performed based on another method. For example, a method of JJP 2018-50216 A can be used.

In this case, the projection unit 190 projects uniform light of luminance $B_1$ and $B_2$ ($B_1<B_2$) onto the projection target and the projection target photographing unit 110 obtains images $I_{B1}$ and $I_{B2}$ by photographing the projection target under the respective conditions.

These images are treated as a minimum luminance image $I_{Min}=I_{B1}$ and a maximum luminance image $I_{Max}=I_{B2}$. An intermediate luminance image $I_O$ is also treated such that $I_O=I_{B1}$ and the process of obtaining $I_O$ in the addition unit is omitted.

The projection result generation unit 132 and the projection image generation unit 180 generate $I_M$ using the following equation.

[Math. 23]
$$I_M(x, y, t) = w \cdot \frac{I_W(x, y, t) - I_{B1}(x, y, t)}{K(x, y)} + B_1$$

Here, K is a value that reflects the albedo (reflectance) of each pixel of the projection target and is calculated as follows.

$$K(x,y) = I_{B2}(x,y) - I_{B1}(x,y)/B_2 - B_1 \qquad [\text{Math. 24}]$$

Although it is basically optimal to set w to 1 (w=1), the user may be allowed to change it such that the contrast of the projection image can be manipulated. If the albedo estimation contains a large amount of error, K may be fixed to 1 (K=1) for all pixels.

To obtain the projection result reproduction image $I_P$, the projection result generation unit 132 obtains $I\hat{}_M(x, y, t)$ through the same procedure as in the first embodiment and calculates $I_P$ using the following equation.

[Math. 25]

$$I_P(x, y, t) = \frac{(I_{B2}(x, y) - I_{B1}(x, y))(\hat{I}_M(x, y, t) - B_1)}{B_2 - B_1} + I_{B1}(x, y)$$

Effects

With the above configuration, the same advantageous effects as those of the first embodiment can be achieved. The present embodiment may be combined with the second to sixth embodiments.

Other Modifications

The present invention is not limited to the above embodiments and modifications. For example, the various processes described above may be executed not only in chronological order as described but also in parallel or individually as necessary or depending on the processing capabilities of the apparatuses that execute the processing. In addition, appropriate changes can be made without departing from the spirit of the present invention.

Program and Recording Medium

The various processing furriers of each device (or apparatus) described in the above embodiments and modifications may be realized by a computer. In this case, the processing details of the functions that each device may have are described in a program. When the program is executed by a computer, the various processing functions of the device are implemented on the computer.

The program in which the processing details are described can be recorded on a computer-readable recording medium. The computer-readable recording medium can be any type of medium such as a magnetic recording device, an optical disc, a magneto-optical recording medium, or a semiconductor memory.

The program is distributed for example, by selling giving, or lending a portable recording medium such as a DVD or a CD-ROM with the program recorded on it. The program may also be distributed by storing the program in a storage device of a server computer and transmitting the program from the server computer to another computer through a network.

For example, a computer configured to execute such a program first stores, in its storage unit, the program recorded on the portable recording medium or the program transmitted from the server computer. That the computer reads the program stored in its storage unit and executes processing in accordance with the read program. In a different embodiment of the program, the computer may read the program directly from the portable recording medium and execute processing in accordance with the read program. The computer may also sequentially execute processing in accordance with the program transmitted from the server computer each time the program is received from the server computer. In another configuration, the processing may be executed through a so-called application service provider (ASP) service in which functions of the processing are implemented just by issuing an won to execute the program and obtaining results without transmission of the program from the server computer to the computer. The program includes information that is provided for use in processing by a computer and is equivalent to the program (such as data having properties defining the processing executed by the computer rather than direct commands to the computer).

In this mode, the device is described as being configured by executing the predetermined program on the computer, but at least apart of the processing may be realized by hardware.

The invention claimed is:

1. A motion vector generation apparatus for automatically adjusting a motion comprising:
    a camera;
    a projector; and
    a computer comprising processing circuitry,
    the processing circuitry configured to:
    execute a first parameter generation process in which the processing circuitry generates a first parameter that is a parameter for scaling a motion vector based on a perceptual difference between a projection result reproduction image which is an image that is obtained by photographing a projection target onto which a projection image obtained based on the motion vector has been projected and a warped image which is an image generated by distorting an image obtained by photographing the projection target by a perceptual amount of motion perceived by viewing the projection result reproduction image from the camera; and
    execute a motion vector reduction process in which the processing circuitry scales the motion vector using the first parameter; and
    displaying, based on the scaled motion vector, the projection result reproduction image using the projector for improved adjustment of motion on display.

2. The motion vector generation apparatus according to claim 1, wherein the processing circuitry configured to:
    execute a non-rigid vector extraction process in which the processing circuitry extracts a non-rigid motion vector component included in a difference between the motion vector and a reduced motion vector that is a motion vector scaled using the first parameter;
    execute a second parameter generation process in which the processing circuitry generates a second parameter using the reduced motion vector and the non-rigid motion vector component, the second parameter being a parameter for scaling the non-rigid motion vector component for compensating for a motion lost due to reduction of the motion vector with the first parameter with the non-rigid motion vector component; and
    execute a motion vector combining process in which the processing circuitry obtains a combined vector by adding the non-rigid motion vector component scaled using the second parameter and the reduced motion vector.

3. The motion vector generation apparatus according to claim 1, wherein the first parameter generation process includes:
    an unnaturalness estimation process in which the processing circuitry estimates a third parameter, which is a coefficient for scaling the motion vector scaled by the first parameter to be the perceptual amount of motion, using a smallest value of a distance between a feature vector representing a perceptual representation of the warped image and a feature vector representing a perceptual representation of the projection result reproduction image which are obtained by applying a perceptual model, and obtains the smallest value as an unnaturalness estimate; and
    a first parameter update process in which the processing circuitry updates the first parameter such that the perceptual difference is closest to a predetermined threshold.

4. The motion vector generation apparatus according to claim 2, wherein the first parameter generation process includes a first parameter smoothing process in which the processing circuitry smooths a first parameter $\lambda'(t_0)$ of a current frame that has been smoothed in a spatial direction in a temporal direction using a first parameter $\lambda''(t_0-1)$ of an immediately previous frame that has been smoothed in spatial and temporal directions and a first value, based on a magnitude relationship between the first value and a difference between the first parameter $\lambda''(t_0-1)$ and the first parameter $\lambda'(t_0)$, and the second parameter generation process includes a second parameter smoothing process in which the processing circuitry smooths a second parameter $\lambda'_2(t_0)$ of the current frame that has been smoothed in the spatial direction in the temporal direction using a second parameter $\lambda''_2(t_0-1)$ of the immediately previous frame that has been smoothed in the spatial and temporal directions and a second value, based on a magnitude relationship between the second value and a difference between the second parameter $\lambda''_2(t_0-1)$ and the second parameter $\lambda'_2(t_0)$.

5. The motion vector generation apparatus according to claim 1, wherein the processing circuitry configured to:

execute $N_P$ pieces of nth parameter generation processes, where $N_P$ is an integer of 3 or more;

execute $N_P$ pieces of nth motion vector combining processes; and execute a non-rigid vector extraction process in which the processing circuitry extracts $N_P$ bandpass components included in a difference between the motion vector and a reduced motion vector that is a motion vector scaled using the first parameter, wherein in the second parameter generation process the processing circuitry generates a second parameter using the reduced motion vector and a first bandpass component, the second parameter being a parameter for scaling the first bandpass component for compensating for a motion lost due to reduction of the motion vector with the first parameter with the first bandpass component, in the second motion vector combining process the processing circuitry obtains a second combined vector by adding the first bandpass component scaled using the second parameter and the reduced motion vector, in the nth parameter generation process the processing circuitry, using an (n−1)th combined vector and an (n−1)th bandpass component, generates an nth parameter that is a parameter for scaling the (n−1)th bandpass component when a motion lost due to reduction of the motion vector with the first parameter is compensated for with the (n−1)th bandpass component, where n=3, 4, . . . , $N_P$+1, and in the nth motion vector combining process the processing circuitry obtains an nth combined vector by adding the (n−1)th bandpass component scaled using the nth parameter and the (n−1)th combined vector, where n=3, 4, . . . , $N_P$+1.

6. The motion vector generation apparatus according to claim 3, wherein the unnaturalness estimation process includes a third parameter estimation process in which the processing circuitry obtains the third parameter by representing a distortion of an image that is obtained by photographing the projection target by a linear approximation using gradient information of the image, the distortion being made based on the motion vector scaled by the first parameter.

7. The motion vector generation apparatus according to claim 1, wherein in the first parameter generation process the processing circuitry generates the first parameter such that a perceptual magnitude of motion obtained by the scaled motion vector relative to a magnitude of the motion vector before being scaled does not fall below a predetermined threshold.

8. A projection image generation apparatus that generates a projection image using the motion vector generated by the motion vector generation apparatus according to claim 1, the projection image generation apparatus comprising processing circuitry configured to:

execute a projection image generation process in which the processing circuitry distorts an image that is obtained by photographing the projection target based on the scaled motion vector to obtain a distorted image, obtains an ideal projection image for reproducing the distorted image, limits the ideal projection image to a physically projectable range of a projection device, and maps the limited projection image to a coordinate system of the projection device based on mapping to coordinates of the projection device from coordinates of an imaging device.

9. A motion vector generation method for automatically adjusting a motion, implemented by a motion vector generation apparatus that includes a camera, a projector, and processing circuitry, the method comprising:

a first parameter generation step in which the processing circuitry generates a first parameter that is a parameter for scaling a motion vector based on a perceptual difference between a projection result reproduction image which is an image that is obtained by photographing a projection target onto which a projection image obtained based on the motion vector has been projected and a warped image which is an image generated by distorting an image obtained by photographing the projection target by a perceptual amount of motion perceived by viewing the projection result reproduction image from a camera; and a motion vector reduction step in which the processing circuitry scales the motion vector using the first parameter; and a displaying step in which the processing circuitry displays, based on the scaled motion vector, the projection result reproduction image using the projector.

10. A non-transitory computer-readable storage medium that stores a computer-executable program for causing a computer to function as the motion vector generation apparatus according to claim 1 or the projection image generation apparatus according to claim 8.

* * * * *